(12) United States Patent
Lin-Hendel

(10) Patent No.: US 7,096,426 B1
(45) Date of Patent: Aug. 22, 2006

(54) CLUSTERED PRESENTATION OF OBJECTS WITH GROUP AND INDIVIDUAL IDENTITY IN, AND VIRTUAL LAYERED COMPOSITION OF, ELECTRONICALLY RECORDED, COMPUTER PRESENTED MEDIA

(76) Inventor: Catherine Lin-Hendel, 18850 Blythswood Dr., Los Gatos, CA (US) 95030

( * ) Notice: Subject to any disclaimer, the term of this patent is extended or adjusted under 35 U.S.C. 154(b) by 0 days.

(21) Appl. No.: 09/564,311

(22) Filed: May 3, 2000

Related U.S. Application Data

(60) Provisional application No. 60/133,115, filed on May 7, 1999.

(51) Int. Cl.
  *G06F 6/00* (2006.01)
(52) U.S. Cl. ........................................ 715/711; 715/737
(58) Field of Classification Search ................ 715/700, 715/763, 765, 711, 715, 737
  See application file for complete search history.

(56) References Cited

U.S. PATENT DOCUMENTS

| | | | |
|---|---|---|---|
| 6,185,314 B1 * | 2/2001 | Crabtree et al. ............ 382/103 |
| 6,512,850 B1 * | 1/2003 | Yaung ........................ 382/225 |
| 6,515,656 B1 * | 2/2003 | Wittenburg et al. ......... 345/302 |
| 6,598,054 B1 * | 7/2003 | Schuetze et al. ........ 707/103 R |
| 6,754,675 B1 * | 6/2004 | Abdel-Mottaleb et al. ....................... 707/104.1 |
| 6,819,336 B1 * | 11/2004 | Nielsen ....................... 715/711 |

* cited by examiner

*Primary Examiner*—Cao (Kevin) Nguyen
(74) *Attorney, Agent, or Firm*—Jean-Marc Zimmerman

(57) ABSTRACT

A method and apparatus for clustered, collaged, and artistically integrated, presentation of digitally stored objects and their images. The clusters are each embedded with each of its own link-tokens and connected to a different set of related information and objects. The clustering also enables simultaneous and collective access of information associated to all objects in the cluster. A method and apparatus for composing the clustered image from individual images, partitioning existing integrated images or photograph of multiple objects, and composing and partitioning clustered images from multiple sources, for the purpose of presenting, associating, and grouping access of categorically related objects and their associated detailed information. A method and apparatus to virtually layer the composition of an electronic media page for imparting differentiated perception and context for subjects or objects of different nature, category, or connotation, and provide separate and different connectivity to each virtual layer.

31 Claims, 55 Drawing Sheets

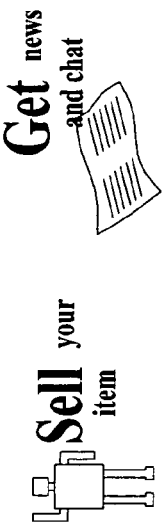
FIG. 1A
(PRIOR ART)

Twill Cap adD to caRt

Put on the official eBay thinking cap. Black brush twill cap. Full-front embroidered logo. Adjustable cloth strap. Brass back closure. One size. Adult. Item #EBY500. $9.95.

Desk Clock adD to caRt

Don't miss a bid with this eBay triple time zone desk clock. Runs on 2 AA batteries (not included). Base is 4 inches. Clock face is 3 inches in diameter. 12-hour or 24-hour settings.
Item #EBY5000. $23.95.

eBay T-shirt

Get comfortable listing and bidding with a white eBay T-shirt. 100% pre-shrunk cotton with eBay logo silk screened on front. Adult sizes S-XXL.
Short Sleeve: $7.95.
Long Sleeve: $11.95.

Short Sleeve (Item #EBY101):
○ S  ○ M  ● L  ○ XL
○ XXL adD to caRt

Long Sleeve (Item #EBY100):
○ M  ● L  ○ XL
XXL is available for $14.95 adD to caRt

Questions? Click here to learn How To Order.
Ready? Click here to Check Out!

 HOME  LISTINGS  BUYERS  SELLERS  SEARCH  HELP  NEWS/CHAT  SITE MAP

Thank you for using eBay!

Copyright © 1995-1999 eBay Inc. *All Rights Reserved.*
Use of this site constitutes acceptance of the eBay Terms and Conditions

*FIG. 1B*
(PRIOR ART)

YAHOO! HOME & GARDEN
*SHOPPING*

Shopping Home - Yahoo! - Help

Welcome, Guest

View Cart/Check Out - Order Status - Sign In

Yahoo! Home and Garden Shopping        Yahoo! prefers 

Home > Home and Garden

Featuring

Rope Bowl Perfumed Candle
$84.00
Buy it

Home and Garden Categories

[ Search ] [ All of Y! Shopping ▼ ]

- Appliances *(249)*
- Bed and Bath *(2701)*
- Furnishings *(2293)*
- Gift Certificates *(34)*
- Housewares *(327)*
- Kitchen *(968)*

- Lawn and Garden *(2101)*
- Pest Control *(2701)*
- Pet Supplies *(784)*
- Pool and Spas *(28)*
- Repair and Improvement *(279)*
- Safety and Security *(7)*

Yahoo! Top Sellers
1. Vegetables: Potato Bin
2. Enviro Steamer Hard Surface Steam Cleaner
3. Seedstarting Made Easy... Germinating Mix. 9 qts
4. Meselun Salad Mix. Certified Organic
5. APS: Accelerated Propagation Systems: APS-2-1
6. La Crosse Down Comforter Full Queen 86x86" 32 oz.
7. La Crosse Down Comforter Bush Zucchini
8. Basil, Certified Organic Genovese Sweet
9. Upright Bravo/Victory/Whirlwing Self-Propelled Belts - Style U
10. Sateen Pillowcases.*; Standard Queen (pair)

Newly Discounted Items
1. Oak Jewelry Armoire   46% off
2. Oak Jewelry Armoire   46% off

Yahoo! Resources
- Auctions
- Classifieds
- Live Net Events
- Yellow Pages

Browse By Brand

- Ariens *(9)*
- Bodum *(13)*
- Braun *(17)*
- Calphalon *(99)*
- Chantal *(51)*
- Cuisinart *(34)*

- Delonghi *(9)*
- Eureka *(64)*
- Kitchenaid *(9)*
- Limoges *(21)*
- Roval Velvet *(27)*
- Sharp *(49)*

Shopping Ideas

Vibrant Salt & Pepper Set   24.95

 Adding color to your kitchen is easy with Olde Thomsons classic acrylic grinders. Hardened steel grinding mechanisms are easily adjustable and guaranteed for a lifetime. 5-1/2"H.
from Kitchenandhome

Virmillion Twenty-Eight Bottle Wine Rack   91.33

 18-1/2" W x 10-1/4" D x 34-1/4" H 13 lbs. Holds 28 bottles. The perfect answer to displaying or storing wine bottles. made of solid oak. Oak has been used for centuries because of its unexcelled qualities of hardness, durability, and distinctive wood grain. Our expert craftsman bring you this outstanding wood in a medium brown stain to offer display and storage for your favorite wines. Each unit is assembled using the highest furniture manufacturing standards. All will offer years of useful service.
from Adatom's Home Dimensions

As You like it, Inc. Black Marble and Crystal Lamp   325.00

 Switch: Hi/LoShade: White Silkwood SheeredShade Size: 6" T x 13" B x 9" DHeight: 28"

from Adatom's Home Dimensions

*FIG. 2A*
*(PRIOR ART)*

YAHOO! SHOPPING 

Shopping Home - Yahoo! - Help

Welcome, Guest                                          View Cart/Check Out - Order Status - Sign In

| Yahoo! Shopping | Yahoo! prefers  |

Featuring

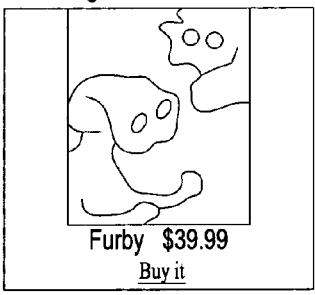

Furby  $39.99
Buy it

New Featured Stores
- Gift Baskets Northwest
- Art of Giving
- TeachChildren.com

```
       Star Wars
    merchandise section
         NEW!
```

Yahoo! Resources
- Auctions
- Classifieds
- Yellow Pages
- Store Listing
- Get a Yahoo! Visa Card
- ClickRewards

 Mother's day Shopping NEW!
Show Mom how much you care. Do your Mother's Day shopping early -- and online. We've got gifts galore. Take your pick.

Catagories
Find your favorite products and brands, and compare prices.

| | Search | All of Y! Shopping ▼ |

Apparel & Accessories
Jewelry, Men's, Women's

Books
Computers, Self-Help, Fiction...

Computers
Desktops, Software, Printers...

Electronics
Stereo, TV, Photography...

Flowers & Gifts
Ballons, Cards, Flowers, Cigars...

Food & Drink
Wine, Cheese, Chocolate, Coffee

Health & Beauty
Bath & Body, Cosmetics, Supplements

Home & Garden
Bed & Baths, Kitchen, Garden

Movies & Video
Comedy, Drama, Science Fiction

Music
Country, Jazz, R&B, Pop...

Office
Paper, Pens, Business Machines...

Sports & Fitness
Running, Golf, Outdoors

Toys, Games & Hobbies
Beanies, Video Games, Collectibles

Travel
Flights, Car Rentals, Hotels...

Copyright © 1994-99 Yahoo! Inc. All rights reserved. Privacy Policy - Security and Deisclaimer
Questions, comments, suggestions? Send us feedback

*FIG. 2B*
*(PRIOR ART)*

YAHOO! SHOPPING 

Shopping Home - Yahoo! - Help

Welcome, Guest     View Cart/Check Out - Order Status - Sign In

| Yahoo! Shopping | Yahoo! prefers  |

Featuring

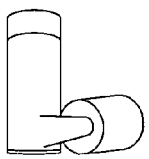

Gourmet Olive Oil Sprayer
$20
Buy it

New Featured Stores
- Gift Baskets Northwest
- Art of Giving
- TeachChildren.com

Star Wars
merchandise section
NEW!

Yahoo! Resources
- Auctions
- Classifieds
- Yellow Pages
- Store Listing
- Get a Yahoo! Visa Card
- ClickRewards

 Mother's day Shopping NEW!
Show Mom how much you care. Do your Mother's Day shopping early – and online. We've got gifts galore. Take your pick.

Catagories
Find your favorite products and brands, and compare prices.

| | Search | All of Y! Shopping  |

Apparel & Accessories
Jewelry, Men's, Women's

Books
Computers, Self-Help, Fiction...

Computers
Desktops, Software, Printers...

Electronics
Stereo, TV, Photography...

Flowers & Gifts
Ballons, Cards, Flowers, Cigars...

Food & Drink
Wine, Cheese, Chocolate, Coffee

Health & Beauty
Bath & Body, Cosmetics, Supplements

Home & Garden
Bed & Baths, Kitchen, Garden

Movies & Video
Comedy, Drama, Science Fiction

Music
Country, Jazz, R&B, Pop...

Office
Paper, Pens, Business Machines...

Sports & Fitness
Running, Golf, Outdoors

Toys, Games & Hobbies
Beanies, Video Games, Collectibles

Travel
Flights, Car Rentals, Hotels...

---

Copyright © 1994-99 Yahoo! Inc. All rights reserved. Privacy Policy - Security and Deisclaimer
Questions, comments, suggestions? Send us feedback

*FIG. 2C*
*(PRIOR ART)*

YAHOO! SHOPPING 

Shopping Home - Yahoo! - Help

Welcome, Guest      View Cart/Check Out - Order Status - Sign In

| Yahoo! Shopping | Yahoo! prefers  |

Featuring

Rio Portable MP3 Audio Player $200.00
Buy it

New Featured Stores
- Gift Baskets Northwest
- Art of Giving
- TeachChildren.com

Star Wars
merchandise section
NEW!

Yahoo! Resources
- Auctions
- Classifieds
- Yellow Pages
- Store Listing
- Get a Yahoo! Visa Card
- ClickRewards

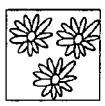 Mother's day Shopping NEW!
Show Mom how much you care. Do your Mother's Day shopping early -- and online. We've got gifts galore. Take your pick.

Catagories
Find your favorite products and brands, and compare prices.

| | Search | All of Y! Shopping  |

Apparel & Accessories
Jewelry, Men's, Women's

Books
Computers, Self-Help, Fiction...

Computers
Desktops, Software, Printers...

Electronics
Stereo, TV, Photography...

Flowers & Gifts
Ballons, Cards, Flowers, Cigars...

Food & Drink
Wine, Cheese, Chocolate, Coffee

Health & Beauty
Bath & Body, Cosmetics, Supplements

Home & Garden
Bed & Baths, Kitchen, Garden

Movies & Video
Comedy, Drama, Science Fiction

Music
Country, Jazz, R&B, Pop...

Office
Paper, Pens, Business Machines...

Sports & Fitness
Running, Golf, Outdoors

Toys, Games & Hobbies
Beanies, Video Games, Collectibles

Travel
Flights, Car Rentals, Hotels...

---

Copyright © 1994-99 Yahoo! Inc. All rights reserved. Privacy Policy - Security and Deisclaimer
Questions, comments, suggestions? Send us feedback

*FIG. 2D*
*(PRIOR ART)*

YAHOO! APPAREL
*SHOPPING*

Shopping Home - Yahoo! - Help

Welcome, Guest

View Cart/Check Out - Order Status - Sign In

Yahoo! Apparel and Accessories Shopping    Yahoo! prefers 

Home > Apparel and Accessories

Featuring

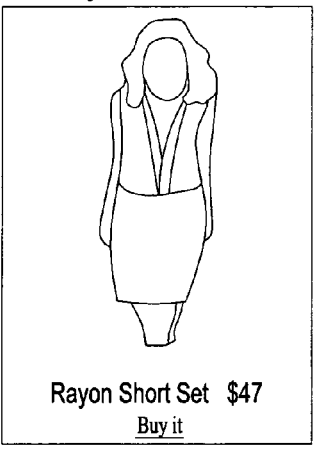

Rayon Short Set  $47
Buy it

Apparel and Accessories Categories

| Search | All of Y! Shopping ▼ |

- Accessories
- Children's *(296)*
- Men's *(7702)*
- Teen's
- Women's *(9025)*

Browse By Brand

- Adidas *(204)*
- Alloy *(17)*
- Bugle Boy *(26)*
- Calvin Klein *(140)*
- Delia's *(7)*
- Donna Karan *(8)*
- Frederick's of Hollywood *(7)*
- Jones New York *(50)*
- Levi's *(10)*
- Nike *(10)*
- Polo Ralph Lauren *(181)*
- Silhouette's *(21)*
- Tommy Hilfiger *(13)*
- Tweeds *(64)*

Newly Discounted Items

1. Crucifix — 21% off
2. CHINESE LIFE BEAD — 15% off
3. CHINA TRADE — 13% off

---

Copyright © 1994-99 Yahoo! Inc. All rights reserved. Privacy Policy - Security and Deisclaimer
Questions, comments, suggestions? Send us feedback

*FIG. 2E*
*(PRIOR ART)* netgrocer.com | Groceries | Medicine Health & Beauty | Gifts & Everything Else! Beauty | ✓ Safe 100% Secure Guaranteed Instant Coupons — (Go)

Scroll Down To Enter

What's New

New Visitors

Customer Sign-In

Store Directory

Customer Service

Slimfast Recall

Work With Us

Talk To Us

FedEx
Click for Shipping Information

TRUST
site privacy statement netgrocer
·········· Click to Give Campaign ··········
To Help Feed Hungry Americans CLICK HERE

*Kellogg's* Cereal
3 for $7.00
(Save up to $4.97)
click for selection

International Coffees
by GENRAL FOODS
*2 for $5* Reg. $3.69 each
click for selection

BreadMachine
List Price: $129.00
Our Price: $99.00
Sale Price: $79.00
click for more info

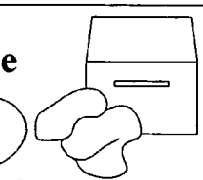

TDK 3-Pack
Advance Quality *Up to 6pcs per page!*
*new lower price!* $3.99
Reg Price: $6.99 (Save $3)
click to buy

Coupon Highlights

Brew Rite 8 Inch
Basket Coffee Filters
(Regular $3.58)
2 / $1.98 - BUY NOW

Dr. Kenaf's Amazing
Light Weight Cat Litter
32 oz. (Regular $4.99)
2 / $5.00 - BUY NOW Gem Extra Virgin
Olive Oil (17 oz.)
$2.49 - BUY NOW

More Coupons

*Mother's Day* Chocolates
CLICK HERE

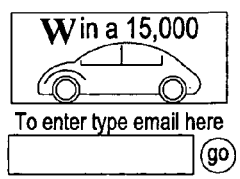
To enter type email here
⬜ (go)
Click here for the Rules

Contact Us | Security Info | Browswer Tips | Privacy Policy | Shipping Information
© 1995-1999 NetGrocer Inc. and/or its suppliers. All rights reserved.
1112 Corporate Rd. North Brunswick, NJ 08902

*FIG. 3*
*(PRIOR ART)*

*Over 500,000 Brand Name Products - 110% Low Price Guarantee - Up to 60% off MSLP*

Shop4 Mother's Day

Feature Buys

Click on the categories below for great deals on closeouts, hot buys and special merchandise.

| | |
|---|---|
| Coffee/Gourmet | Flowers |
| Gift Baskets | Home Comfort |
| Jewelry | Travel |

Sign Up for Exclusive Previews

Recieve updates on special offers, new services, upcoming events and much more! Click Here to see a sample

Your email address:

[                                                    ]

SUBMIT

What's New...

-  FREE Vacation
- 

FREE Vacation Offer
Sign up NOW and get a FREE Vacation located in fabulous destinations!

Gift Ideas
Click here to select the perfect gift for that special person on your list.

- 
-

Books, Music & Videos
Select from our online selection of Books, Music, & Videos and enjoy exceptional savings!

Consumer guide
Click here to obtain product reviews and suggestions for Consumer Guide rated selections.

Feature Buys

Country Garden Bouquet
~~$35.00~~
$28.00

Crystal Swan Bouquet
~~$50.00~~
$40.00

Mother and Child Bouquet
~~$65.00~~
$52.00

Swan Lake Music Box Bouquet
~~$65.00~~
$52.00

Rose Candle Bouquet
~~$50.00~~
$40.00

A Mother's Love Teapot Bouquet
~~$45.00~~
$36.00

*FIG. 4A*
*(PRIOR ART)*

© Copyright 1999 Signature Agency, Inc. a division of The Signature Group. All rights reserved. Unauthorized duplication or reproduction is a violation of applicable laws.

Flowers USA MD89COUN
Country GardenBouquet

Member Price: $28.00

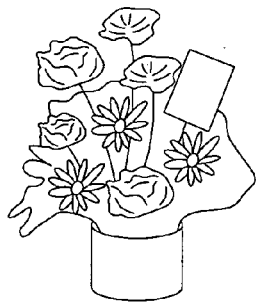

Order Now!

| | |
|---|---|
| List Price: | $35.00 |
| MEMBER PRICE | $28.00 |
| Savings up to: | $7.00 |

Description

Ceramic cup and miniature book featuring illustrations by artist Mary Engelbreit. This bright bouquet features pink Carnations, purple Lisanthus, yellow Daises and beautiful accent flowers. Cup measures 4.5" width (at cup opening) x 4.75" height.

View Compatible Items
View Flowers USA products in this category
View all Flowers USA Products

| Featured Categories | Don't Miss these Special Features! |
|---|---|
| > Steam Wizard® Steamer & Wet/Dry Vacuum- SM420<br>> Family Radio (Yellow/each) - FR460YEL<br>> Ionic Breeze™ Silent Air Purifier - SI624<br>> CD Radio/Alarm Clock with Sound Soother ™ - SI585<br>> 7 1/2 Foot Darth Vader - DV500 | AuctionWatch™ is your personal bidding agent! |

| Items recently added to our auction | |
|---|---|
| > CompacCart® 200 Folding Luggage Cart - ME007<br>> The Travel Trio - LF900TAN<br>> Money Whirl Bank with Counter - SI442<br>> Citybug Electric Scooter - JD021<br>SI585<br>> Mini Scooter Rollerboard - JD021<br>> Brown Mock Crocodile Leather Clip Card - IX504GLD<br>> Leather DeepPocket Wallet (Brown) - HL802BRN<br>> Fast Break Roller Hockey - HK500<br>> 8x20mm GolfScope - GT301<br>> Remote-Controlled Excavator - GB101 |  | help and info | registration | auction results | special offers | FAQ"s 2 of 2                                          4/18/99 4:58 PM

*FIG. 5B*
*(PRIOR ART)*

sharperimage.com *Auction*

| HOME | HELP AND INFORMATION | REGISTRATION | AUCTION RESULTS | SP | FAQ's | AUCTION WATCH |

One-of-a-kind | Brand-new | Virtually new | Less-than-new | HOME collection

Brand-new products

*These products are brand new, first quality, never sold, never opened, fresh from the manufacturer—exactly as you would buy at one of our stores. Our regular auction return privilege applies.*

MultiBid Feature
You can bid on multiple items at once right from this page by (1) inputting your customer id and password below (2) inputting your bid amount after any items for which you want to place bids and (3) clicking the Submit Bids this Page Button. You can also bid from individual product pages, which you can access by clicking on the link for the product name.

ID#: [          ]   Password: [                    ]

---

( ← view previous items )    ( view next items → )

| Item: | Picture | Retail Price | Current Bid | Quantity | Auction Ends (PST) |
|---|---|---|---|---|---|
| Weebot ™ Electronic Pet (White) - SI505WHT | ☒ | $39 | $15 | 10 | 04/19/99 2:00PM |

Auction # 501810   Bid: ○   Watch: ○   Qty: [1]   Bid: [$16]   AutoBid:

| Item: | Picture | Retail Price | Current Bid | Quantity | Auction Ends (PST) |
|---|---|---|---|---|---|
| Sharper Image Radio/Lantern - MB200 | ☒ | $60 | $19 | 5 | 04/19/99 2:00PM |

Auction # 501857   Bid: ○   Watch: ○   Qty: [1]   Bid: [$20]   AutoBid:

| Item: | Picture | Retail Price | Current Bid | Quantity | Auction Ends (PST) |
|---|---|---|---|---|---|
| Wine Tote Cooler - LF901 | ☒ | $39 | $20 | 5 | 04/19/99 2:00PM |

Auction # 501856   Bid: ○   Watch: ○   Qty: [1]   Bid: [$21]   AutoBid:

| Item: | Picture | Retail Price | Current Bid | Quantity | Auction Ends (PST) |
|---|---|---|---|---|---|
| Euro Waxer - HF718 | ☒ | $40 | $11 | 5 | 04/19/99 2:00PM |

Auction # 501855   Bid: ○   Watch: ○   Qty: [1]   Bid: [$12]   AutoBid:

| Item: | Picture | Retail Price | Current Bid | Quantity | Auction Ends (PST) |
|---|---|---|---|---|---|
| Aluminum Wall Clock - GU068 | ☒ | $25 | $5 | 10 | 04/19/99 2:00PM |

Auction # 501855   Bid: ○   Watch: ○   Qty: [1]   Bid: [$6]   AutoBid:

| Item: | Picture | Retail Price | Current Bid | Quantity | Auction Ends (PST) |
|---|---|---|---|---|---|
| Vitesse Gold Bezel Chronograph - EQ336 | 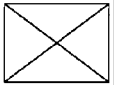 | $99 | $20 | 5 | 04/19/99 2:00PM |
| Auction # 501853  Bid: ○  Watch: ○  Qty: [1]  Bid: [$25]  AutoBid: ||||||
| Item: | Picture | Retail Price | Current Bid | Quantity | Auction Ends (PST) |
| Vitesse Two Tone Sport Watch - EQ336 |  | $99 | $20 | 5 | 04/19/99 2:00PM |
| Auction # 501852  Bid: ○  Watch: ○  Qty: [1]  Bid: [$25]  AutoBid: ||||||
| Item: | Picture | Retail Price | Current Bid | Quantity | Auction Ends (PST) |
| Women's Personal Care Kit - DM920 |  | $50 | $12 | 10 | 04/19/99 2:00PM |
| Auction # 501851  Bid: ○  Watch: ○  Qty: [1]  Bid: [$13]  AutoBid: ||||||
| Item: | Picture | Retail Price | Current Bid | Quantity | Auction Ends (PST) |
| Faux Marble Rollerball - DA238 |  | $70 | $16 | 5 | 04/19/99 2:00PM |
| Auction # 501850  Bid: ○  Watch: ○  Qty: [1]  Bid: [$17]  AutoBid: ||||||
| Item: | Picture | Retail Price | Current Bid | Quantity | Auction Ends (PST) |
| Classic Trilogy Edition Monopoly - CS428 |  | $25 | $15 | 5 | 04/19/99 2:00PM |
| Auction # 501849  Bid: ○  Watch: ○  Qty: [1]  Bid: [$16]  AutoBid: ||||||
| Item: | Picture | Retail Price | Current Bid | Quantity | Auction Ends (PST) |
| Scientific Theory™ Vitamins - AX299 |  | $60 | $9 | 5 | 04/19/99 2:00PM |
| Auction # 501848  Bid: ○  Watch: ○  Qty: [1]  Bid: [$10]  AutoBid: ||||||
| Item: | Picture | Retail Price | Current Bid | Quantity | Auction Ends (PST) |
| 3 CD/Dual Cassette Mini System - AL600 |  | $199 | $80 | 5 | 04/19/99 2:00PM |
| Auction # 501847  Bid: ○  Watch: ○  Qty: [1]  Bid: [$90]  AutoBid: ||||||
| Item: | Picture | Retail Price | Current Bid | Quantity | Auction Ends (PST) |
| SlamMan - ZK313 | 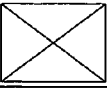 | $299 | $180 | 3 | 04/19/99 2:00PM |
| Auction # 501846  Bid: ○  Watch: ○  Qty: [1]  Bid: [$205]  AutoBid: ||||||

*FIG. 5D*
(PRIOR ART)

| Item: | Picture | Retail Price | Current Bid | Quantity | Auction Ends (PST) |
|---|---|---|---|---|---|
| AM/FM Radio with Swivel Spotlight - YW640 | ☒ | $13 | $3 | 5 | 04/19/99 2:00PM |

Auction # 501845    Bid: ○    Watch: ○    Qty: [1]    Bid: [$4]    AutoBid:

| Item: | Picture | Retail Price | Current Bid | Quantity | Auction Ends (PST) |
|---|---|---|---|---|---|
| Tan & Mist Lounge - YV601 | ☒ | $79 | $26 | 5 | 04/19/99 2:00PM |

Auction # 501844    Bid: ○    Watch: ○    Qty: [1]    Bid: [$28]    AutoBid:

| Item: | Picture | Retail Price | Current Bid | Quantity | Auction Ends (PST) |
|---|---|---|---|---|---|
| Figure Eight Pool - YV155 | ☒ | $129 | $45 | 5 | 04/19/99 2:00PM |

Auction # 501843    Bid: ○    Watch: ○    Qty: [1]    Bid: [$55]    AutoBid:

| Item: | Picture | Retail Price | Current Bid | Quantity | Auction Ends (PST) |
|---|---|---|---|---|---|
| Mini Tower Clock Radio - YP078 | ☒ | $13 | $5 | 5 | 04/19/99 2:00PM |

Auction # 501842    Bid: ○    Watch: ○    Qty: [1]    Bid: [$6]    AutoBid:

| Item: | Picture | Retail Price | Current Bid | Quantity | Auction Ends (PST) |
|---|---|---|---|---|---|
| Touch-Screen Solitaire - YL206 | ☒ | $20 | $4 | 10 | 04/19/99 2:00PM |

Auction # 501841    Bid: ○    Watch: ○    Qty: [1]    Bid: [$5]    AutoBid:

| Item: | Picture | Retail Price | Current Bid | Quantity | Auction Ends (PST) |
|---|---|---|---|---|---|
| Enduro Racer - YL205 | ☒ | $25 | $3 | 10 | 04/19/99 2:00PM |

Auction # 501840    Bid: ○    Watch: ○    Qty: [1]    Bid: [$4]    AutoBid:

| Item: | Picture | Retail Price | Current Bid | Quantity | Auction Ends (PST) |
|---|---|---|---|---|---|
| J-200 Guitar Model - XO801 | ☒ | $30 | $3 | 5 | 04/19/99 2:00PM |

Auction # 501839    Bid: ○    Watch: ○    Qty: [1]    Bid: [$4]    AutoBid:

(← view previous items)    [1] 2 3 4    (view next items →)

Submit bids from this page auction home | help and info | registration | auction results | special offers | FAQ's

*FIG. 5E*
*(PRIOR ART)*

[Previous Item] [Up] [Next Item]

Vitesse Two Tone Sport Watch - EQ326    Brand-new

| | bid detail |
|---|---|
| AUCTION NUMBER | 501852 |
| CURRENT BID | $20 |
| BID INCREMENT | $5 |
| QUANTITY AVAILABLE | 5 |
| AUCTION ENDS ON | 04/19/99 2:00PM(PST) |

Retail Price:

Item Description

Vitesse has improved on its already incomparable Italian style and Japanese quartz movements by offering eye-catching styles! The two-tone Sport Watch features a magnifying dome crystal. 50-meter water resistence, one way ratcheted bezel, and two-tone gold plated adjustable stainless steel bracelet.

| | place your bid! |
|---|---|
| CUSTOMER ID | |
| PASSWORD | |
| Forgot your ID/password? We'll send it to you or register | |
| BID AMOUNT | $25 |
| SET MAX BID AMOUNT WITH AUTOBID | |
| ACCEPT LESS QUANTITY? | ⦿ YES  ○ NO |
| PLACE MY BID | Bid now! |
| I'M NOT BIDDING ON THIS BUT PLEASE ADD IT TO MY AUCTIONWATCH | Add it! |

Current Winning Bids For This Item

| NAME | STATE | DATE/TIME | BID QUANTITY | BID AMOUNT |
|---|---|---|---|---|
| kornee | LA | 04/18/99 07:03AM | 1 | $20 |
| yesssss | CT | 04/18/99 12:25PM | 1 | $20 |
| seacolony | MD | 04/18/99 2:17PM | 1 | $20 |
| buck | TX | 04/18/99 3:00PM | 1 | $20 |
| freaky tah | MD | 04/18/99 3:00PM | 1 | $20 |

Current Runners Up For This Item

| NAME | STATE | DATE/TIME | BID QUANTITY | BID AMOUNT |
|---|---|---|---|---|
| Ozcouple69 | VA | 04/17/99 07:43PM | (0 of 1) | $15 |
| Lan Doy | NJ | 04/17/99 8:22PM | (0 of 1) | $15 |
| yomaster | WA | 04/18/99 2:55PM | (0 of 1) | $15 |

Rank of bidders listed by the highest bidder, greatest quantity, date the item was bid on, and the time the bid was placed. All times are PST Note to AutoBid users: The AutoBid feature is an optional feature which allows you to place a blanket bid on an item. This way you do not have to be present to raise your bid to the next acceptable bid level should someone else outbid you. If someone outbids you, the AutoBid acts as your agent and raises you bid to the next acceptable winning bid. This will continue until your AutoBid limit is reached. In the event of ties, the Autobid is the winning bid.

auction home | help and info | registration | auction results | special offers | FAQ's

FIG. 5G
*(PRIOR ART)*

Home/Departments/

- Junior Long Sleeve Blouse
- Junior Novelty Shirts
- Junior Short Sleeve Sweaters
- Juniors - XOXO
- Misses Career Dresses
- Misses Crochet Tops
- Misses Short Sleeve Tees
- Sportswaer
- Junior Long Sleeve Sweaters
- Junior Short Sleeve Shirt
- Junior Short Sleeve Tees
- Juniors Contemporary
- Misses Career Suiting
- Misses Short Sleeve Shirts
- Misses Vests & Sleeveless Tops

| Hot Deals |

Max Studio Long Pleated Skirt

~~$130.00~~

$29.99

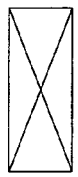

Junior Sizes: [large ▽]
[Order]

Reference Point Blue Crochet Top $12.00

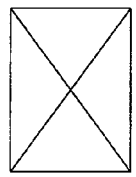

Misses Sizes: [large ▽]
[Order]

525 Made in America Hooded Short Sleeve Shirt

~~$40.00~~

$16.99

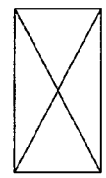

Misses Sizes: [small ▽]
[Order]

Evan Picone Red A-Line Dress

~~$128.00~~

$39.99

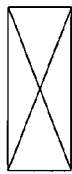

Misses Sizes: [16 ▽]
[Order]

Max Studio Long Sleeve Sheer Blouse

~~$95.00~~

$29.99

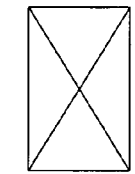

Junior Sizes: [large ▽]
[Order]

Ean Picone layered Formal Dress

~~$148.00~~

$39.99

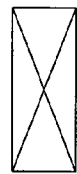

Misses Sizes: [6 ▽]
[Order]

Home | Departments | Basket | Search | Help | Shop | About | Shipping
Safely   Cybershop   Charts

MicroWarehouse

Home/Departments/

- Denim　　　　　　　　　　　　　- Mens Polo Shirts
Young Mens Active Wear　　　　　- Young Mens Polo Shirts

| Hot Deals |

Fila Warm-up Suit　　　　Dolce & Gabbana Grey Cotton　　Calvin Klein Black Denim Jacket
　　　　　　　　　　　　Shirts ~~$130.00~~　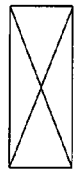　~~$85.00~~　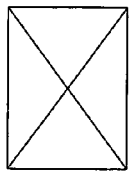　~~$100.00~~　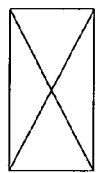

$44.99　　　　　　　　$25.00　　　　　　　　　　$35.00

Men's Sizes: [Medium ▽]　　Young Men's: [Small ▽]　　men's Sizes: [Medium ▽]
[Order]　　　　　　　　　　[Order]　　　　　　　　　　　[Order]

Calvin Klein Denim Vest

~~$58.00~~　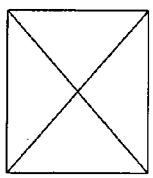

$25.99

Men's Sizes: [Large ▽]
[Order]

---

Home | Departments | Basket | Search | Help | Shop Safely | About Cybershop | Shipping Charts ( Looking for a parking space )　( Already finished shopping at styleclick.com )　Click Here

*FIG. 6B*
*(PRIOR ART)*

Home/Departments/

[Search]

Search for: [          ]  [Search]

1. Versace Sun and Moon Fabric Tote Save Over 40%
   Home/Departments/Womens Accessories/Handbags Versace Sun and Moon Fabric Tote Save Over 40% click image to view enlargement The Versace "Sun and Moon" Fabric Collection tote has
2. Versace Fabric Backpack Save 45%!
   Home/Departments/Womens Accessories/Handbags Versace Fabric Backpack Save 45%! click image to view enlargement The Versace "Sun and Moon" Fabric Collection backpack has an
3. Versace Fabric Collection Handbag Save Over 45%!
   Home/Departments/Womens Accessories/Handbags Versace Fabric Collection Handbag Save Over 45%! click image to view enlargement The Versace "Butterflies" Fabric Collection handbag
4. Versace Large Fabric Tote Save Over 40%!
   Home/Departments/Womens Accessories/Handbags Versace Large abric Tote Save Over 40%! click image to view enlargement The Versace "Paisley" Fabric Collection large tote has
5. Versace Fabric Sling Bag Save Over 50%
   Home/Departments/Womens Accessories/Handbags Versace Fabric Sling Bag Save Over 50% click image to view enlargement The Versace "Kittens" Fabric Collection bucket tote, or sling
6. Versace Fabric Bifold with Coin Wallet Save Over 40%!
   Home/Departments/Womens Accessories/Handbags Versace Fabric Bifold with Coin Wallet Save Over 40% click image to view enlargement This bifold wallet with coin purse is from
7. Versace Fabric Cosmetic Case Over 45% Off
   Home/Departments/Womens Accessories/Handbags Versace Fabric Cosmetic Case Over 45% Off click image to view enlargement This roomy cosmetic case is from "Versace-Sun & Moon". It
8. Versace Fabric Full Zip Around Wallet Save Over 40%
   Home/Departments/Womens Accessories/Handbags Versace Fabric Full Zip Around Wallet Save Over 40% click image to view enlargement This full zip around wallet is from "Versace-Sun
9. Versace Fabric Key Case Save Over 30%!
   Home/Departments/Womens Accessories/Handbags Versace Fabric Key Case Save Over 30%! click image to view enlargement This key case is from "Versace-Medusa". The snap case has 5
10. Versace Fabric Eyeglass Case Save 50%!
    Home/Departments/Womens Accessories/Handbags Versace Fabric Eyeglass Case Save Over 50%! click image to view enlargement This eyeglass case is from "Versace-Kittens". It measures 3
11. Site Index
    Home/Departments/ - 525 Made in America Black Short Sleeve Sweater save 62% - 525 Made in America Black Tee Shirt WEEKEND SPECIAL SAVE 63% - 525 Made in America Button down 3/4
12. Handbags
    Home/Departments/Womens Accessories Adolfo Leather Handbag Save Over 50%! Leather Handbag Classic styling in finely textured leather. Features center pocket with silver-toned snap
13. Womens Accessories
    Home/Departments/ - Handbags Adolfo Large Tote Pierre Balmain Leather Back Pack $180.00 $89.99 Color: Black Brown ") } // - > $187.50 $84.99 Color: Black Bone Redwood

*FIG. 6C*
*(PRIOR ART)*

Home/Departments/Womens Accessories/Handbags

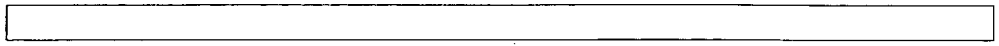

Versace Sun and Moon Fabric Tote Save Over 40% click image to view enlargement

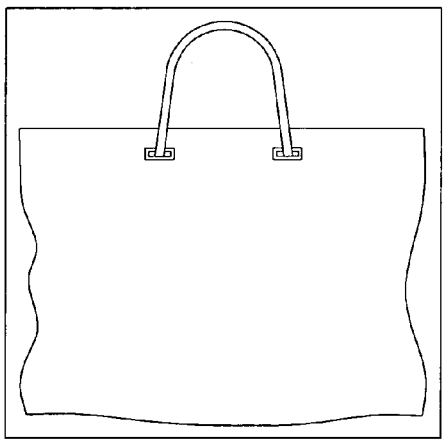

The Versace "Sun and Moon" Fabric Collection tote has an additional and convenient oversized front pocket, Includes a detachable, fabric shoulder strap, and a Versace key chain. 15x10

92651 Versace Sun and Moon Fabric Tote Save Over 40%

~~$175.00~~  $99.99

Pattern: 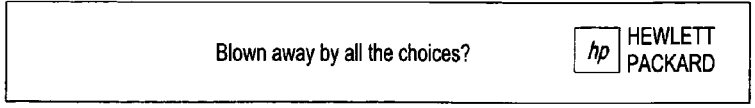 

Home | Departments | Basket | Search | Help | Shop Safely | About Cybershop | Shipping Charts Blown away by all the choices?    *hp* HEWLETT PACKARD 1 of 1                                    4/18/99 9:18 PM

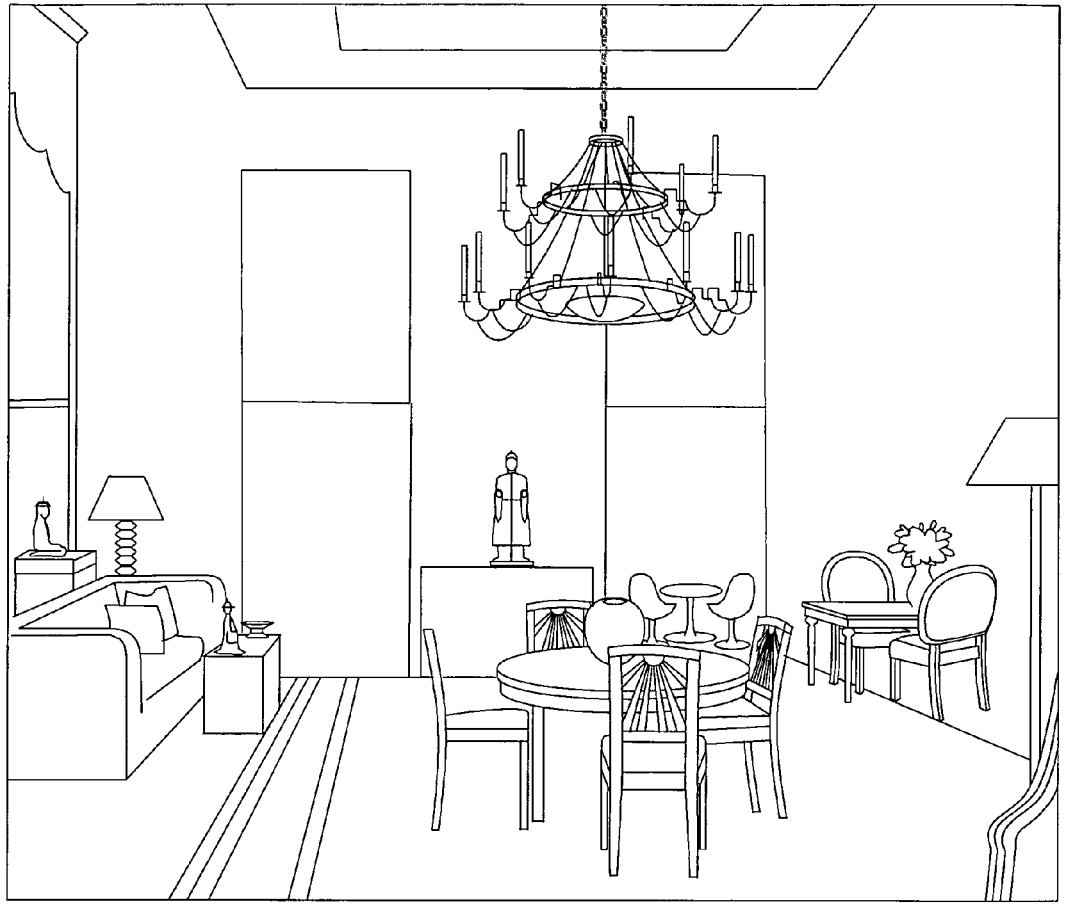

ingeniously spatial and absolutely breathtaking.

The living room entrance is framed with a 16th-century Florentine carved portal with gesso and parcel gilt that was purchased by formaer owner Whitnay Warren, as were the fireplace and Trumeau. These along with the 17th-century Russian chandelier, were restored and gracefully incorporated into the contemporary design.

Like the hall and den, the living room floors are parquet oak and the walls integral color plaster. The ceiling has soft integrated lighting. An antique Swedish maogany table and chairs stand under the chandelier, which works well for intimate little dinners, and there are sofas and chairs upholstered in celadon and putty-colored silk velvet and damasks. The artifacts, the colors, and the light and play of scale and form make this room unforgettable.

The den was gutted and refinished in fabric paneling. The new molding ceiling has integrated lighting as well. This particular Brayton-designed ceiling is lacquered to a high sheen, which enhances its geometric design. One wall, with the entrance to the solarium dividing it, is fitted with glass shelves and special lighting to house pre-Colombian and Mezzo-American objects. A suite of wood, leather and fabric chairs was designed by Gary Hutton as were lacquer side tables.

All the rooms feature tall windows to let in the view. The solarium has walls which are entirely glass. The room is draped in fabric to suggest a tented space with outdoor orientation. The sofas and Roman shades are done in off-white linen and satin stripe. The floors are limestone, and a pair of 18th-century Italian chandeliers glows above a Saarinen table with chairs while a tall handsome

*FIG. 10B*
*(PRIOR ART)*

WINDING TO ALLOW THE WATCH TO BLEND SEAMLESSLY INTO YOUR LIFESTYLE. FOR MANY THOUGH, A ROLEX IS MUCH MORE THAN THE SUM OF ITS FEATURES. AS A GIFT, OR AS A PUCHASE FOR YOURSELF, A ROLEX REPRESENTS A TIMEPIECE OF RARE DISTINCTION. THERE IS NO OTHER TIMEPIECE LIKE IT.

Photojournalist Chris Rainier: Exotic Images and Photo Essays of Indigenous Cultures
*www.bonnievie.com*
Chris Rainier
*Photography*
Color Gallery
CLICK ON IMAGES TO ENLARGE
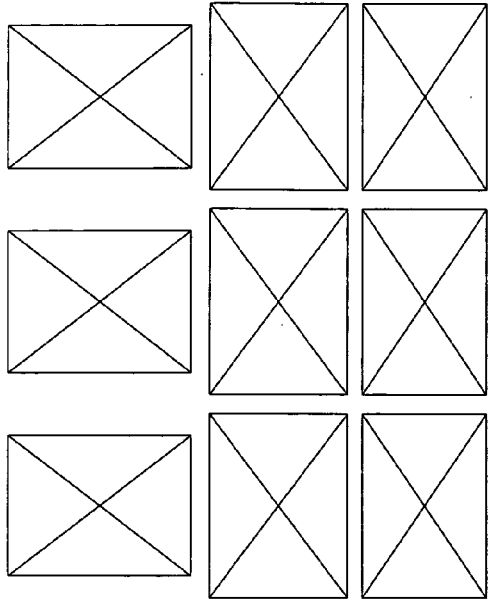
Black and White Gallery
CLICK ON IMAGES TO ENLARGE
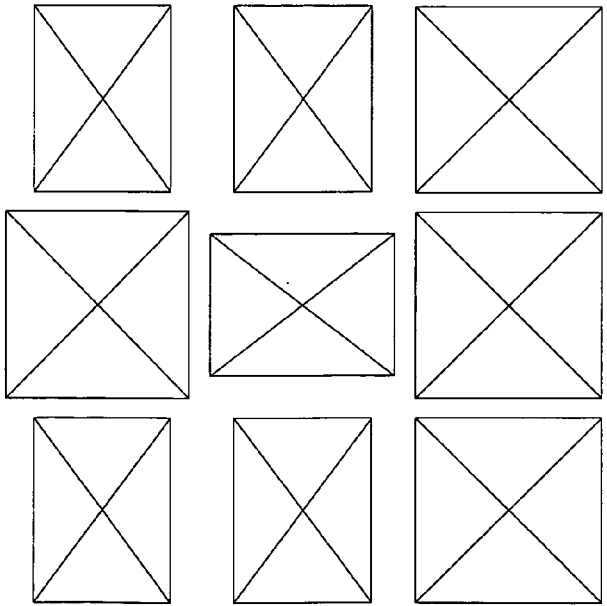
http://makecom/Bonnievie/chrisrainier.html
4/28/1999
*FIG. 13*

FIG. 16A

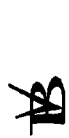

BONNIEVIE.COM

FEATURE PRODUCTS

| PICTURE | DESCRIPTION | AUCTION BIDS |
|---|---|---|
|  | 1 lot of 5 Rolex Man's watches and 1 Rolex Woman's Watch<br><br>Rolex watches have set the standard for quality, elegance and durability in timekeeping.<br><br>retail value: $75.00<br><br>Seller: Rolex International<br><br>[Details] | Current Bid $30,000.00   Starting Bid: $10,000.00<br>Quantity: 1 lot                       Bid increment $2,000.00<br>Ends                                     Mail this auction to friend<br>Started                                 Request a gift alert<br>SSL Protection                    E-mail to merchant<br><br>Bid Amount  [$        ]<br>Auto Bid Max [$        ]<br>Membership ID [            ]<br>Credit Card Number [        ]  Expiration Date [    ] |
|  | Cognac Napoleon Grande Reserve<br><br>Origin: Cognac, France<br>Aplication: Grande Champagne<br>Vintage: 1811<br>Bottle Size: 750ml bottle<br>Provenance: removed from underground storage from New England Cellar<br>Condition: Ullage: 10.75cm; label in excellent condition<br>Note: This wine is located at the Mid-west storage facility. | Current Bid $3,950.00    Starting Bid: $3,300.00<br>Quantity: 1                             Bid increment $50.00<br>Ends                                     Mail this auction to friend<br>Started                                 Request a gift alert<br>SSL Protection                    E-mail to merchant<br><br>Bid Amount  [$        ]<br>Auto Bid Max [$        ]<br>Membership ID [            ]<br>Credit Card Number [        ]  Expiration Date [    ] |

4/28/1999 http://makecom/Bonnievie/BVFeatures.html

FIG. 16B

1999 Harley XLH Sportster 883

The raw-boned connects like a left hook. Solo seat. Low handlebar. Short dual exhaust. The fuel tank can hold 3.3 gallons for added range. 883c Evolution V-Twin pours out the trademark torque. An ear-to-ear grin comes standard.

Color: Check selections:
- ☐ Vivid Black
- ☐ Lazer Red Peral
- ☐ Aztec Orange Peral

| | |
|---|---|
| Current Bid $25,000.00 | Starting Bid: $20,000.00 |
| Quantity: 4 | Bid increment $1,000.00 |
| Ends | Mail this auction to friend |
| Started | Request a gift alert |
| SSL Protection | E-mail to merchant |
| Bid Amount $ | |
| Auto Bid Max $ | |
| Membership ID | |
| Credit Card Number | Expiration Date |

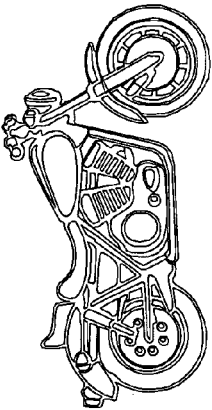

Qing Dynasty Ceramic Vase

Christie's presale estimate $320,000

Emperial yellow field with blue dragon and long-life motiff.
22"H x 8"W seller: Christie's Asia

[Details]

| | |
|---|---|
| Current Bid $690,000.00 | Starting Bid: $400,000.00 |
| Quantity: 1 | Bid increment $10,0000.0 |
| Ends | Mail this auction to friend |
| Started | Request a gift alert |
| SSL Protection | E-mail to merchant |
| Bid Amount $ | |
| Auto Bid Max $ | |
| Membership ID | |
| Credit Card Number | Expiration Date |

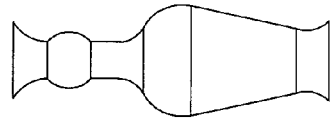

Diamond, Platinum, and Gold Wrist Band

The unusual design of diamond jewelry is one of our specialties. At Hamilton

| | |
|---|---|
| Current Bid $1,300.00 | Starting Bid: $1,000.00 |
| Quantity: 1 | Bid increment $100.00 |
| Ends | Mail this auction to friend |
| Started | Request a gift alert |
| SSL Protection | E-mail to merchant |
| | 4/28/1999 |

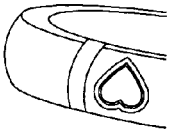

http://makecom/Bonnievie/BVFeatures.html you like diamonds and diamond jewelry that is like nothing you have ever seen.

Seller: Hamilton Jewelers

[Details]

Bid Amount $ ____
Auto Bid Max $ ____
Membership ID ____
Credit Card Number ____ Expiration Date ____

Pomerol Club Chair

From New Orleans, Pomerol Chair is upholstered in Antiqued Cream Parisian leather and features overstuffed seat cushion, nailhead trim, and bun feet.

32"W x 28"D x 34"H

Also available: wide choices of fabric or customer ordered material.

Seller: Council

Current Bid $250.00
Quantity: 1
Ends
Started
SSL Protection

Bid Amount $ ____
Auto Bid Max $ ____
Membership ID ____
Credit Card Number ____ Expiration Date ____

Starting Bid: $100.00
Bid increment $50.00
Mail this auction to friend
Request a gift alert
E-mail to merchant

Fashion Jacket

Beautiful Superwist 150, wool and silk all season jacket from MaxMara, Size 10, Golden Brown, double breasted, silk lined.

Seller: Maxmara Boutique of San Francisco

[Details]

Current Bid $550.00
Quantity: 1
Ends
Started
SSL Protection

Bid Amount $ ____
Auto Bid Max $ ____
Membership ID ____
Credit Card Number ____ Expiration Date ____

Starting Bid: $300.00
Bid increment $50.00
Mail this auction to friend
Request a gift alert
E-mail to merchant

*FIG. 16C*

Secret Cellars® www.bonnivre.com

*Wine Club*
Home

Our Wines

New Arrivals
California Wines
European Wines
"New World" Wines
Other U.S. Wines
Samplers & Gifts

Secret Cellars ® Wine Club

About Secret Cellars Wine Club
Join Secret Cellars Wine Club

Sample *Cellars Notes* Vol. 1.7
...Graeser Winery, Port & Sherry!

Other Products

Specialty Coffees
Specialty Teas
Caviar
Gift Certificates
Spanish Olive Oil

About Secret Cellars®

Winter Wine Sale
ONLY TWO WEEKS LEFT!
*Look for reduced prices throughout our inventory*

Our Winter Wine Sale is on! Look for discounted wines throughout our inventory.
But hurry! Sale ends May 31, 1999.

- New Arrivals
- California Wines
- European Wines
- New World Wines
- Other US Wines

New Arrivals: Browse through the newest selections in our wine inventory...

California: Wines from Napa, Sonoma, Santa Barbara...

Europe: Wines from Bordeaux, the Rhone, Chianti, Alsace...

"New World". Wines From Australia, South Africa, New Zealand...

Other United States: Wines from Oregon, Washington, New York...

Secret Cellars Wine Club | Secret Cellars Samplers
Specialty Coffees | Specialty Teas | Caviar | Gift Certificates
The Life of a Wine | Starting a Cellar | Wine Tasting Terminology
Purchaing Cases | Recipes
Ways to Order | Contacting Us | E-Mail

*Secret Cellars is not affiliated with PRP Wine International, Inc.* http://makecom/Bonnievie/Wines/wine.html                4/28/1999

*FIG. 18*

THE PRODUCTS | MOTORCYCLES | XLH SPORTSTER 883 STANDARD

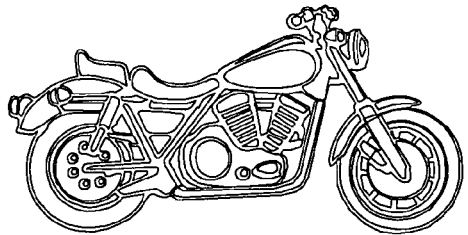

1999 XLII Sportster 883

Sometimes the best way to see how good a thing can get is to get down to it purest form. Take a look at the Sportster 883. The raw-boned connects like a left hook. Solo seat. Low handlebar. Shorty dual exhaust. The fuel tank is a work of art, true to the lean Sportster tradition and holding 3.3 gallons for added range. no one would blame you for just staring. But the real treat is the ride. The light, rigid frame keeps you manueverable, yet it feels great at speed. Get on the gas and the 883cc Evolution V-Twin pous out its trademark torque. An ear-to-ear grin comes standard.

| COLOR SELECTOR |
|---|
| Vivid Black |
| Lazer Red Pearl |
| Aztec Orange Pearl |
| Cobalt Blue Pearl |

Select a color name on the left to view the color options for this model.

NOTE: Tank colors shown are for online demonstration purposes only. Consult your local Harley-Davidson Dealer for true color representation.

▶ TECHNICAL SPECS AND PRICING
▶ COMPARE MODELS
▶ LARGE PHOTO POP-UP WINDOW (30 KB)
▶ DISTANT RELATIVE POP-UP WINDOW

What is a Sportster?
Click here to find out!

FIG. 20

Accessiroze your Harley-Davidson with Genuine Motor Accessories

Click here to find your Harley-Davidson dealer http://makecom/Bonnievie/harley/xlh883.html                    4/28/1999

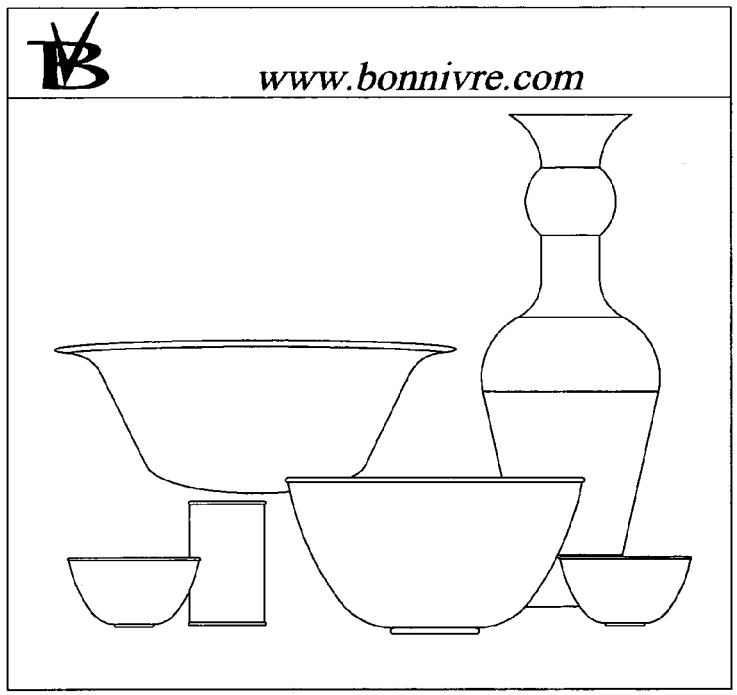

Ming-Qing Dynasty Antique Market

*The Asian economic crisis has reached the Chinese antique market in Hong Kong, where many collectors are tightening their belts instead of buying.*

BY JANE L. LEVERE

When all of the bidding and gavel-striking were completed this past fall in Hong Kong, Christie's and Sotherby's officials must have breathed long sighs of relief. The Asian economic crisis hadn't silenced their antique auctions.
At Sotherby's, a Ming dynasty blue and white vase sold to a London dealer for $1.4 million. The same dealer, Eskenazi bought a Ming blue and white stemmed bowl for nearly $1 million. At Christie's, a Hong Kong dealer spent $690,000 for a Qing ceramic vase - nearly double the presale estimate - and Eskenazi paid $860,000 for a Qing dynasty enamel wine cup, a record price for an enamel cup from that period.
"The finacial situation in Asia did not deter buyers", said Anthony Lin, deputy chairman for Christie's Asia, in a Christie's press release. In a statement released by Sotherby's, Carlton Rochell, managing director of Sotherby's China and Southeast Asia operations, echoed Lin's sentiment: "In view of the current economic situation an Asia, we are satisfied with the overall performance of the sales."
the auction houses were satisfied with the sales because - the fall auction tallies notwithstanding - for collectors of Chinese antiques, now is the time and Hong Kong is the place to buy low. Trepidation about Asia'a economic future has dampened wealthy Hong Kong residents' enthusiasm for spending money, thus driving down the prices of all luxury goods there, including antiques.

*FIG. 21*

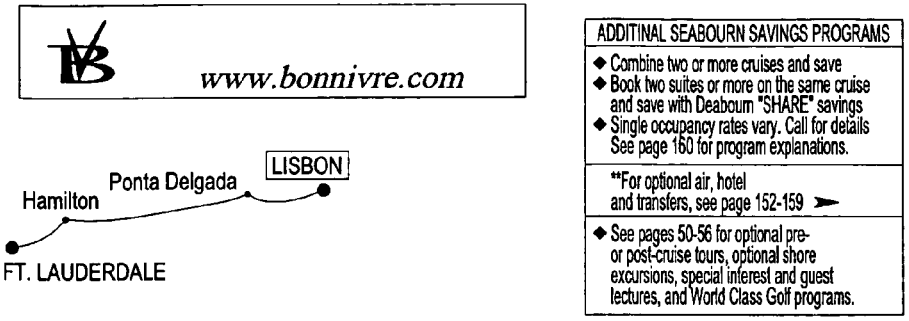

www.bonnivre.com

LISBON
Ponta Delgada
Hamilton

FT. LAUDERDALE

ADDITIONAL SEABOURN SAVINGS PROGRAMS
- Combine two or more cruises and save
- Book two suites or more on the same cruise and save with Seabourn "SHARE" savings
- Single occupancy rates vary. Call for details
  See page 160 for program explanations.

**For optional air, hotel and transfers, see page 152-159 ➤

- See pages 50-56 for optional pre- or post-cruise tours, optional shore excursions, special interest and guest lectures, and World Class Golf programs.

THE MEDITERRANEAN

An Atlantic Passage                          March 31 - April 13, 1998

CRUISE 3808 ♥ LEGEND                                      13 DAYS

MAR
31  T   Ft. lauderdala, Florida  Depart 5pm    4   S   Cruising the
                                                       Atlantic Ocean        5 days
MAR                                            9   Th  Ponta Delgada, Azores 1pm/6pm
1   W   Cruising the                          10   F   Cruising the
        Atlantic Ocean         2 days                  Atlantic Ocean        3 days
3   F   Hamilton, Bermuda      8am/5pm        13   M   Lisbon, Portugal      Arrive 6am

CRUISE-ONLY** FARES ARE PER PERSON, DOUBLE OCCUPANCY.

| Cruise 3808 | Days | Seabourn Suites A | Seabourn Suites A1 | Seabourn Suites A2 | Seabourn Suites A3 | Classic Suites B | Royal Suites B | Owner's Suites B | Pres. Suites B |
|---|---|---|---|---|---|---|---|---|---|
| | 13 | $6,990 | $7,190 | $7,590 | $7,990 | $9,990 | $10,990 | $11,990 | $15,990 |

*Pay in full by 9/30/97 and save 5%.*
*O Club members (previous guests) save 15%.*
*Two or more suites earn 5% "SHARE" savings.*
*(See also Cruise 1809 page 62.)*

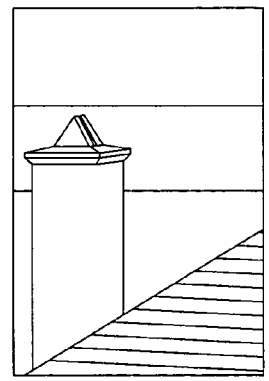

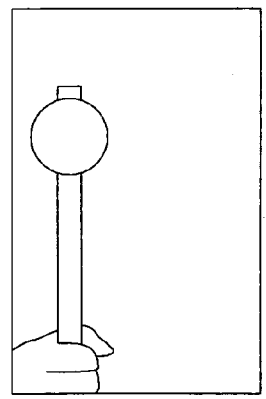

Bermuda is one of the last
bastions of the British Empire

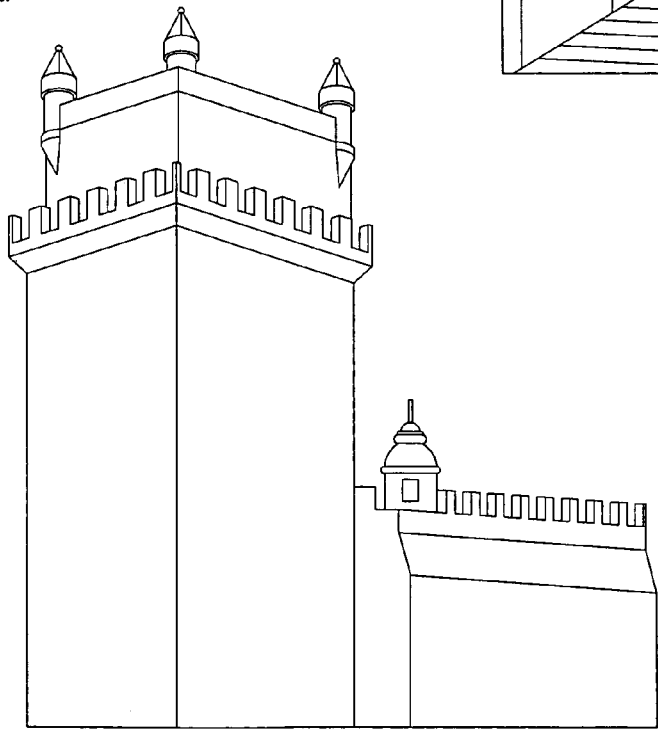

*FIG. 23*

GE Monogram Professional Cooking Products

The Portal to Good Living

- Shopping
- Auction, Sales
- Build to Order
- Personal Concierge
- Registration
- My Folder
- Listings
- Search
- Communications Concierge
- Executive Web Concierge
- Articles, Magazines
- News, Events
- Chat, Forum
- Bulletin Board
- RFP, RFQ

Bon Vivre

BonVivre | Home Furnishing | Kitchen | Appliances | GE Monogram | Professional Range

GE Monogram® Professional-Cooking Products

The GE Monogram® professional free-standing ranges include built-in cooktops, backguards, and hoods.

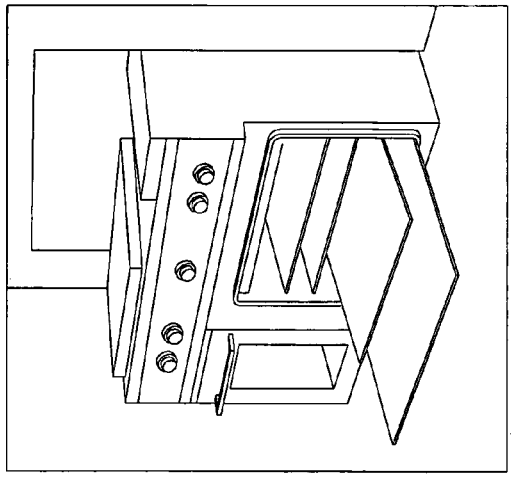

| Range Width: | ○ 48" | ○ 36" | ○ 30" | |
|---|---|---|---|---|
| Fuel: | ○ Natural Gas | ○ Liquid Propane Gas | | |
| With Oven: | ○ Yes ○ No | | | |
| 48" Cooktop: | ○ 6 Burners & 1 Grill | | | *Picture* |
| | ○ 6 Burners & 1 Griddle | | | *Picture* |
| | ○ 4 Burners, 1 Grill & 1 Griddle | | | *Picture* |
| 36" Cooktop: | ○ 6 Burners & 1 Grill | | | *Picture* |
| | ○ 6 Burners & 1 Grill | | | *Picture* |
| | ○ 4 Burners, 1 Grill & 1 Griddle | | | *Picture* |
| 30" Cooktop: | ○ 4 Burners | | | *Picture* |
| Backguard: | ○ 1-1/2" Trim ○ 12" Height ○ 22" Height | | | |
| Hood Styles: | ○ Professional Hoods (48" & 36") | | | *Picture* |
| | ○ Professional Straight-Sided Hood (48", 36" & 30") | | | *Picture* |

*Detailed Information*

FIG. 24B1

FIG. 24B2

GE Monogram HomePage

- Shopping
- Auction, Sales
- Personal Concierge
- Registration

- Your Folder
- Listings
- Search

The Portal to Good Living

Bon Vivre

- Communications Concierge
- Executive Web Gear

- Articles, Magazines
- News, Events
- Chat Forum
- Bid Board
- Bulletin Board

- E-mail
- Calendar
- Reminder
- Address Book
- Net2Phone
- Click2Dial

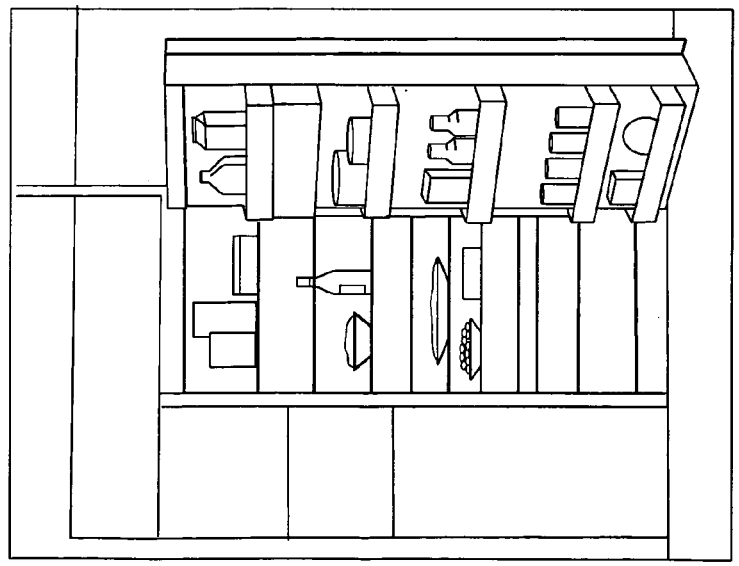

GE Monogram refrigerators have adjustable shelves and bins to easily accommodate any and all storage requirements. Both fresh food and freezer compartments have individual temperature controls for precise calibration. Automatic door holds keep both doors stationary at 90 degrees.

| Merchant Services | FAQ | Help | Site Map | Home | Top

FIG. 24C

GE Monogram HomePage

The Portal to Good Living

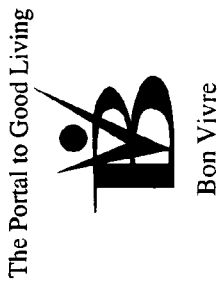

Bon Vivre

- Shopping
- Auction, Sales
- Personal Concierge
- Registration

- Your Folder
- Listings
- Search

- Communications Concierge
- Executive Web Gear

- Articles,
- Magazines
- News, Events
- Chat, Forum
- Bid Board
- Bulletin Board

- E-mail
- Calendar
- Reminder
- Address Book
- Net2Phone
- Click2Dial

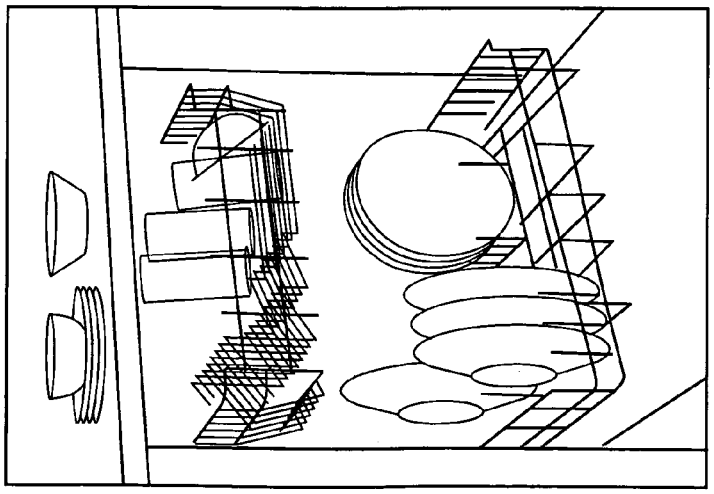

Three layers of insulation make Monogram dishwashers one of the quietest available. A monitor keeps track of and displays the minutes remaining at each point of the wash and dry cycle. And drying is by convection heating.

| Merchant Services | FAQ | Help | Site Map | Home | Top

*FIG. 24D*

GE Monogram HomePage

The Portal to Good Living

Bon Vivre

- Shopping
- Auction, Sales
- Personal Concierge
- Registration
- Your Folder
- Listings
- Search
- Communications Concierge
- Executive Web Gear
- Articles, Magazines
- News, Events
- Chat, Forum
- Bid Board
- Bulletin Board
- E-mail
- Calendar
- Reminder
- Address Book
- Net2Phone
- Click2Dial

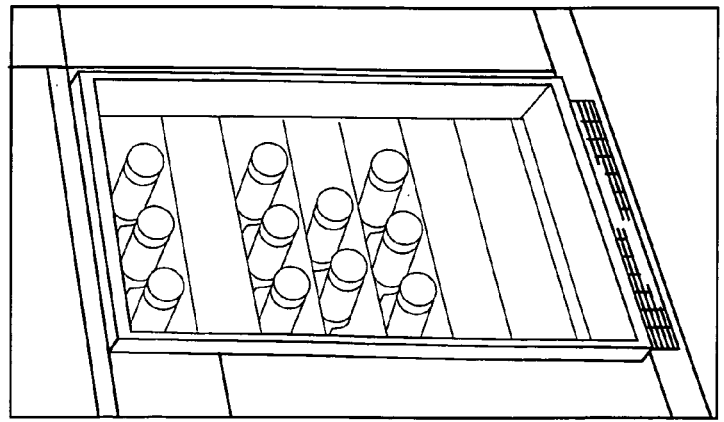

Monogram wine coolers hold fifty bottles on convenient slide out racks. Temperatures can be set from between the mid 40 degree range and up to the mid 80 degree range so that fine wines can be kept at the perfect temperatures.

| Merchant Services | FAQ | Help | Site Map | Home | Top

*FIG. 24E*

CLUSTERED PRESENTATION OF OBJECTS WITH GROUP AND INDIVIDUAL IDENTITY IN, AND VIRTUAL LAYERED COMPOSITION OF, ELECTRONICALLY RECORDED, COMPUTER PRESENTED MEDIA

PRIORITY NOTICE

This Non-Provisional U.S. patent Application claims the benefit of the May 7, 1999 filing date of Provisional U.S. patent application Ser. No. 60/133,115.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention is related to the collaged, clustered, and integrated presentation of multiple objects stored in electronic media, assigning group identities, memory addresses and link-tokens to the integrated or collaged clusters, while also partition and assign individual identifies, memory addresses and link-tokens to individual objects in the cluster. The invention further relates to active virtual-layering of an electronic media page, providing simultaneous yet differentiated presentation, perception, and linking for subjects and objects of different nature, connotation, category and/or connectivity. Also related are concept, methods, and apparatus for layering, clustering, composing and active linking of such multidimensional electronic media pages.

2. Description of Related Art

The application of hyper text mark up language (HTML), scripting languages such as Java, Common Gateway Interface (CGI), Practical Extraction and Report Language (PERL), Visual Basic Script Language, VB (Visual Basic) Script, and derivatives thereof, other languages, markup languages, or meta-languages, such as the Standard Generalized Markup Language (SGML-ISO 8879), extensible Markup Language (XML), Cascading Style Sheet (CSS), and Java Speech Markup Language (JSML), allows the static and dynamic linking of computer/electronically stored objects (texts, graphics, icons, parts, items, lists, audio and video segments, etc.) from a container of objects to related information and/or other objects and containers via software link-tokens.

A link-token is an addressing pointer, pointing to the memory location of the link destination. A link-token is represented by an underline, bolded text-string, a bullet, an icon, a graphical thumbnail, a text-string of distinguishable color, or a text-string that changes color when the cursor of the computer screen is placed on top of it. The presence of a link-token is indicated in state-of-the-art "browsers" such as Microsoft Internet Explorer and Netscape Navigator by a "hand" symbol that appears when the cursor of the computer screen is placed on top of an object that has a link-token associated with it. An electronic media "page" has a single and unique LRL (Universal Resource Locator) address. It can physically occupy less, equal to, or more than one or many computer-screen lengths and producing one or many conventional 8½" by 11" printed paper pages, when printed. Graphical thumbnails are small images frequently used in on-line or other computer viewable recording media (such as CDROM) to represent objects that are best represented by images. When a link-token associated with a particular object is selected and invoked, for example, by clicking a computer "mouse" button while the pointer is resting at the object or token, the destination object that is linked by the link-token is brought forth from the database or memory bank in the connected storage media addressed by the link-token, and presented for viewing or examination by humans, devices, or computer software.

In the prior art, only one link can be selected and invoked from a segment or a page of electronic media being displayed via its memory address or URL, where numerous hyper-linked objects and link-tokens are present. Only the destination object addressed by, and connected to this particular selected and invoked link-token is brought forth for viewing or examination from the recording media addressed by the particular link-token. If one or more additional objects from the starting page of media is of interest, one must return to the page to make a single selection, and evoke its associated link-token, again, one at a time, from each one page. Moving forward and backward between segments (pages) of media linked by the link-tokens in this manner is a slow and labor intensive procedure.

In this "one object, one-link" and "one page, one link-selection" prior-art operation in the Internet, Intranet, Extranet "Web Media" and CDROM or other digitally stored and computer viewable media, objects are also represented and presented singly and individually by an icon, a word, an individual text-string, an individual graphic thumbnail, or a stand alone graphics, as a single entity in its entirety, either with no more than a single link to a single container/segment/page of related information.

For example, in the field of Electronic Commerce, buying and selling merchandise on the Internet, multiple "featured items," "top sellers," or "hot items" are used for promotional and sales purposes. They are shown as a list of text-strings, a list of graphical thumbnails, individual one-item images arranged over a page with or without text descriptions. Or, the featured items would time-share the home page one-at-a-time, each appearing at a different time.

FIG. 1A illustrates the text-string listing of ebaY's "featured" items on its Home-Page at the center of the page. FIG. 1B illustrates the static graphical representation and text descriptions of the EBAY memorabilia-shop items arranged over the page. FIG. 2A, Yahoo Shopping Home & Garden Page, illustrates the text-string list of "top sellers" on the left margin. Yahoo Shopping's Home-Page "featured" items "time-share" the Site Home-Page. Each item is shown individually with its picture and brief description in a box that takes a top portion of the left side of the page at a different, as shown in FIGS. 2B, 2C, 2D. These Figures are screen prints of the Yahoo Shopping Home-Page at different times. FIGS. 2A and 2E illustrate Yahoo Shopping's fixed "featured item" for Category (apparel and home & garden categories) Home-Pages. FIG. 3 illustrates "banner" type boxed feature listing at NetGrocer. FIG. 4A illustrates Shop4Home Mother's Day "featured buys" graphical thumbnail listing. FIG. 4B is the description page linked to the first "featured buy" item in FIG. 4A. FIGS. 5A &5B illustrate Sharper image's Auction Home-Page with its text-string "featured products" and "items recently added." FIGS. 5C, 5D, 5E illustrate Sharper Image Auction's thumbnail listing of "brand new products." FIG. 5F shows the item description page linked to a particular thumbnail item. FIGS. 6A, 6B, and 6C illustrate the graphical thumbnail listing and text-string listings of CyberShop.COM's "hot deals." FIG. 6D is the description page linked to item 5 on FIG. 6C's text-string list. All the above examples typify the discrete, discontinuous, E-presentation of objects in the Web and other electronic media of the prior art.

Human perception and human mind, on the other hand, prefer the continuous and connected, beautiful objects beautifully grouped together, presented with befitting background or natural setting and harmonious companion objects. Human perception also prefers harmonious differentiation of classes of objects or subjects with different context, connotation, and meaning. Skillful and pleasant presentation not only is known to improve perception and impression, increase the speed and depth of understanding, learning and remembering, but also works well in alluring and enticing human desire and fondness for the objects thus skillfully presented.

Macys.Com uses un-boxed inactive thumbnail to represent its on-line shopping categories, with link-tokens embedded in the accompanying text headings as shown in FIG. 7A. Macys.Com's next pages uses a boxed thumbnail and a text-string list as shown in FIG. 7B. FIGS. 7C and 7D are two of the description pages with boxed images and text descriptions connected to indices in the text-string list in FIG. 7B under the boxed thumbnail on the right side of the page. The "headline" banner graphics common to FIGS. 7B, 7C, and 7D is static and decorative, having no link or dynamic function associated with it. FIG. 8 illustrates the Home-Page layout of GreatFood.Com, The central graphics shows a pleasing cluster of foodstuff. However, it is a decorative single entity static image with no link, no partition, and no function other than decorative.

The merchandising and advertising images in print and television media are entirely different from the discrete, abrupt, single item electronic media presentation of the electronic media prior art. FIGS. 9A and 9B are joint print advertisements of CHANEL No. 5 and MACY'S, appearing in magazines, respectively. Products are grouped, and presented with a beautiful young woman, a pleasing pastel purple case, and blissful butterflies, implying that beautiful and leisurely people use Chanel No. 5 and shop at MACY'S. The images further suggest that if you use Chanel No. 5 and shop at MACY'S, (you or your wife or girlfriend) would be just as beautiful, and your life would be just as blissful.

FIGS. 10A and 10B are promotional photographs from Northern California Home & Design, a print magazine of interior furnishing products and trades. Furniture and accessories are arranged in room settings, suggesting the fine workmanship, class, and tasteful home setting with rugs, fireplaces, and nice tall windows. The images intend to transport viewers to the frame of mind of desiring these products. FIGS. 11A and 11B are full-page images from Hamilton Jewelers' catalog. Grouping and clustering of products are photographed against soft and classy background to convey a sense of richness, refinement, and luxury. Such examples are routine and abundant in the world of static, however, un-actionable print and television media. It is apparent that the prior-art single object, stand-alone presentation used in electronic-media and electronic-commerce, although dynamic and actionable, is not consistent with the well known perceptional and sensual preferences in human, and most likely possesses less potential for achieving desired goal to impress and entice buyers. The prior art of advertising in printed media, however, produces images that is static, unseparable, and unactionable.

SUMMARY OF THE INVENTION

The present invention provides for the actively layered, clustered, integrated, and collaged graphical presentation of multiple graphic subjects/objects in electronic media, while assigning layer and group identities, memory addresses, and link-tokens to the layers and clusters, and individual identities, memory addresses, and link-tokens to each and all individual objects. The invention allows the assigning of different designation information and object(s) specifically linked and accessed through each layer and each cluster, as well as assigning designation information and objects specifically linked and accessed through individual objects in the cluster. Such provisions enable the deployment of well-researched human perception preferences and artistic presentation techniques to the electronic media, while also maximizing and optimizing the dynamic linking and large storage capabilities of the electronic media, as well as optimizing the usefulness of the "real-estate," i.e., the viewing-area of an electronic media page.

The invention further relates to methods and apparatus for composing the layered images from multiple images, layering an existing image, composing clustered images from multiple images of individual objects, partitioning an existing image of multiple objects, or a combination of the two methods. In all methods, layer identities and link-tokens are assigned to layers, group identities and link-tokens are assigned to clustered partitions linking to different destination objects and information, and individual identity and link-tokens are assigned to each individual object for accessing the destination objects and information assigned to individual objects. The methods and apparatus enable the deployment of artistic know-how and human-factor techniques to the electronic, Internet, Web, and computer commerce and presentation applications, as opposed to the currently artistically-challenged and human-perception-wise inferior status of the web. The methods and apparatus, on the other hand, also allow adding tremendous value to costly images developed for the print and television media by using them in electronic media, electronically layering and partitioning the images, and embedding the layers and partitions with active and actionable links.

The virtual layered composition of an electronic media page provides a tool to present to viewers differentiated intensity level and differentiated connectivity to each layer. Therefore, subjects or objects of different nature, category, connotation, and connectivity can be presented and comprehended simultaneously at appropriate and differentiated context, without causing confusion.

BRIEF DESCRIPTION OF THE DRAWINGS

FIGS. 1A and 1B show ebaY.Com web pages as examples of the prior art.

FIGS. 2A–2E show Shopping.Yahoo.Com web pages as examples of the prior art.

FIG. 3 shows the Net Grocer.Com home page as an example of the prior art.

FIGS. 4A and 4B show Shop4Home.Com web pages as examples of the prior art.

Figure 5A:
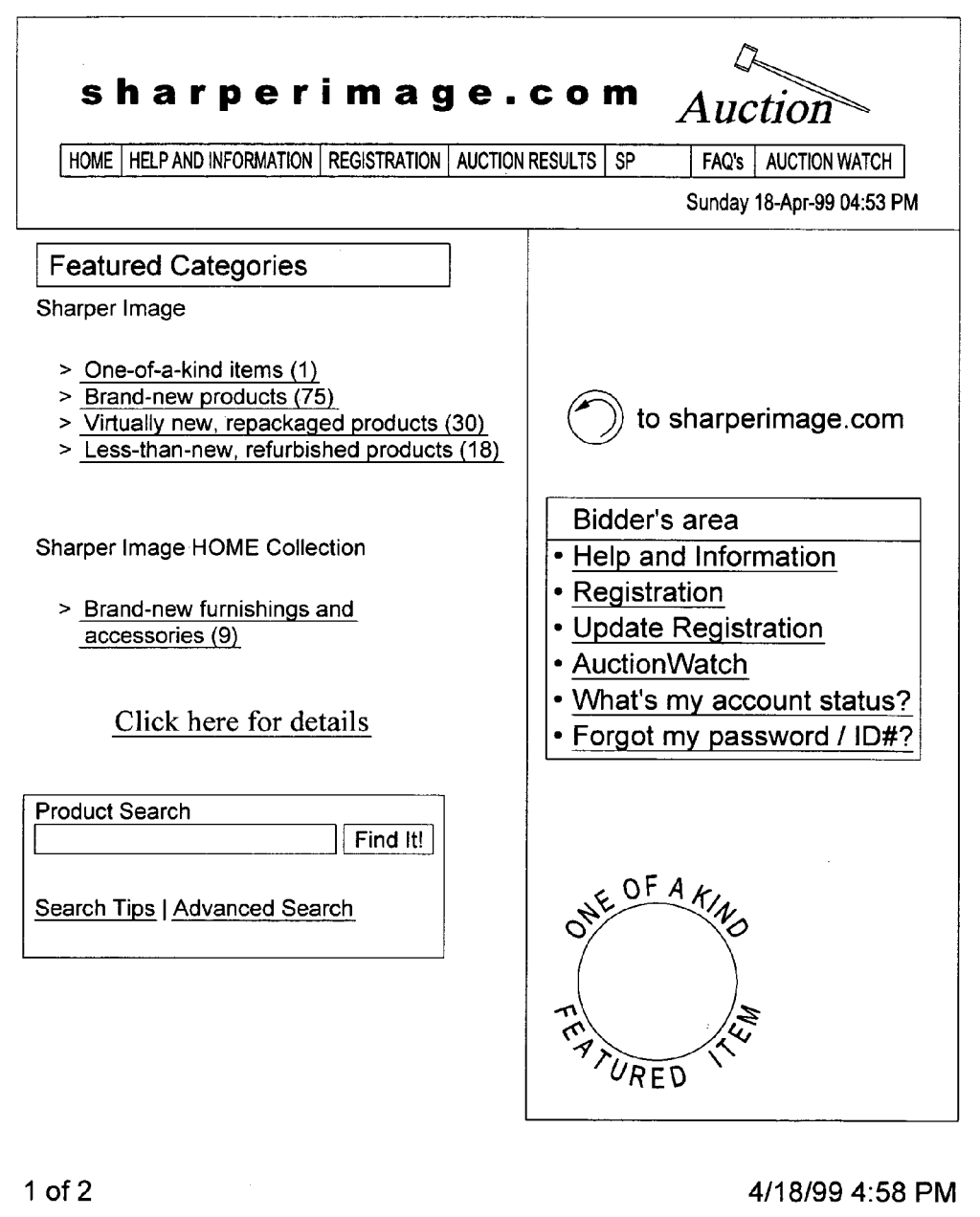

FIGS. 5A–5G show SharperImage.Com web pages as examples of the prior art.

FIGS. 6A–6D show CyberShop.Com web pages as examples of the prior art.

Figure 7C:
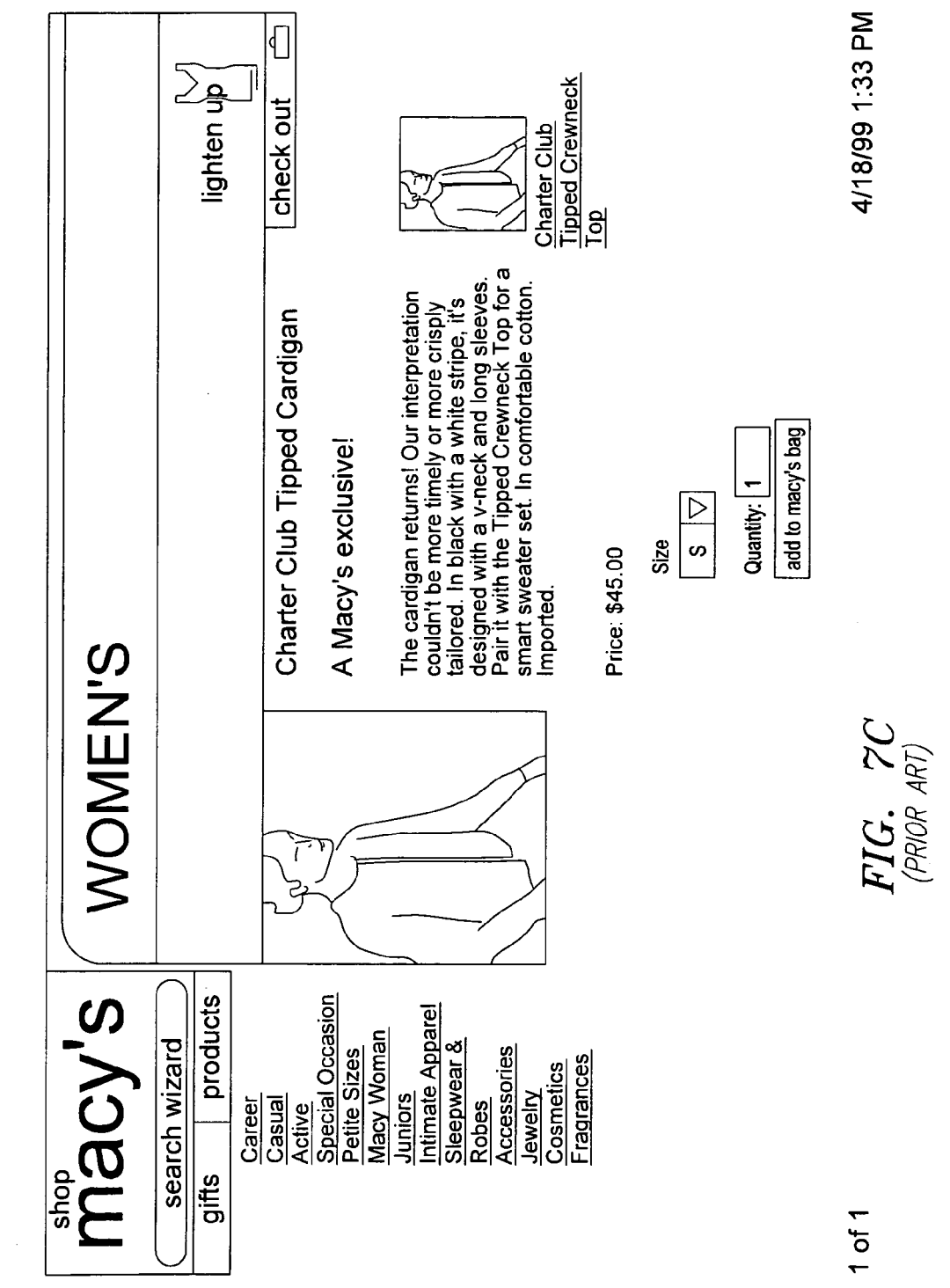

FIGS. 7A–7D show Macys.com web pages as examples of the prior art.

FIGS. 10A–10B Northern California Home Design article prints as examples of the prior art.

FIG. 13 shows the destination page linked to the background layer in FIG. 12

FIGS. 16A–16C show the web page (in 3 paper pages when printed) brought forth when the clustered domain is clicked in FIG. 15B, illustrating an embodiment of the present invention.

FIG. 18 shows the electronic media page brought forth when the partitioned domain in FIG. 17 is clicked, illustrating an embodiment of the present invention.

FIG. 20 shows the detailed product information page is brought forth when the Harley-Davidson Motorcycle domain in FIG. 19 is clicked, illustrating an embodiment of the present invention.

FIG. 21 shows the destination page linked to the Qing-Vase domain in FIG. 17, illustrating an embodiment of the present invention.

FIG. 23 shows the destination web page linked to the Bel'em Tower background domain in FIG. 23, illustrating an embodiment of the present invention.

FIGS. 24A–24E show an embodiment of the present invention for importing and partitioning an existing product group photograph of GE Monogram appliances, activating the imported electronic image, and each individual product domains partitioned within the total image.

DETAILED DESCRIPTION OF THE EMBODIMENTS OF THE INVENTION

Figure 7A:
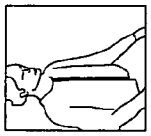
Figure 7B:
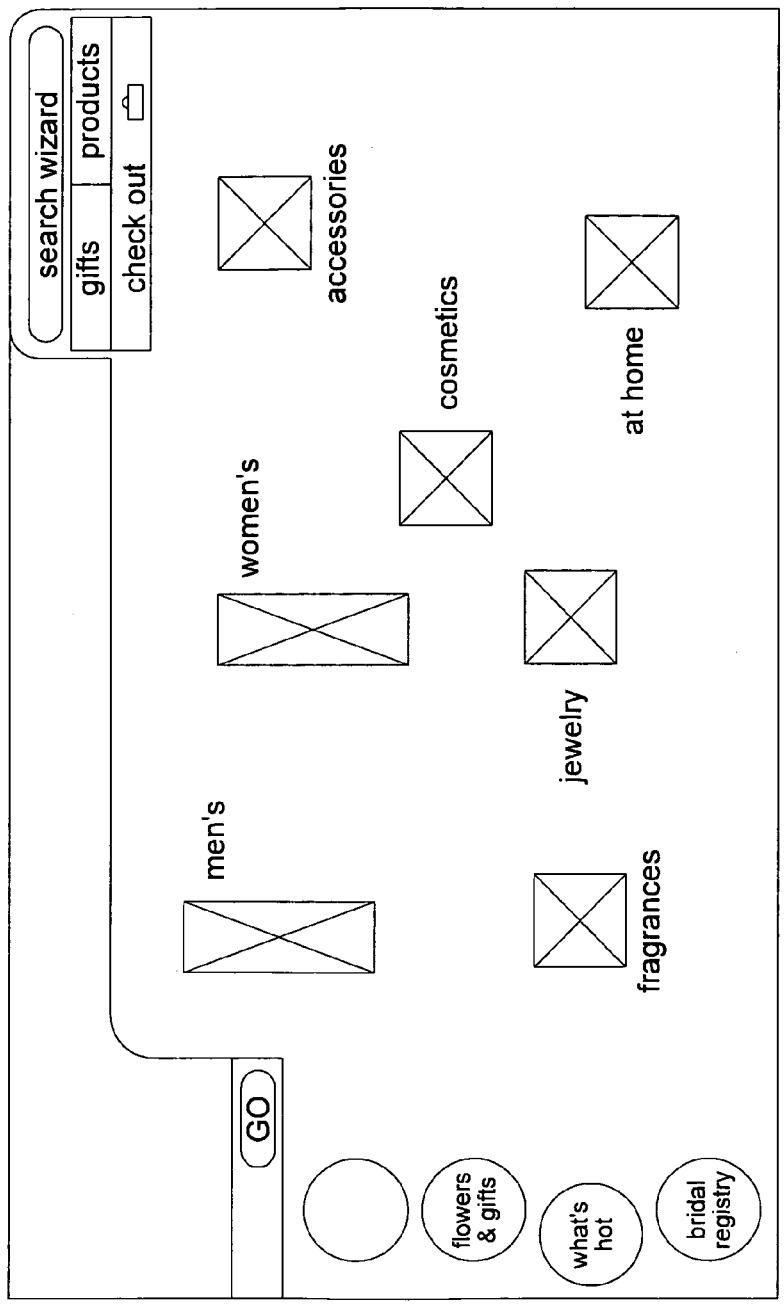
Figure 7D:
Figure 8:
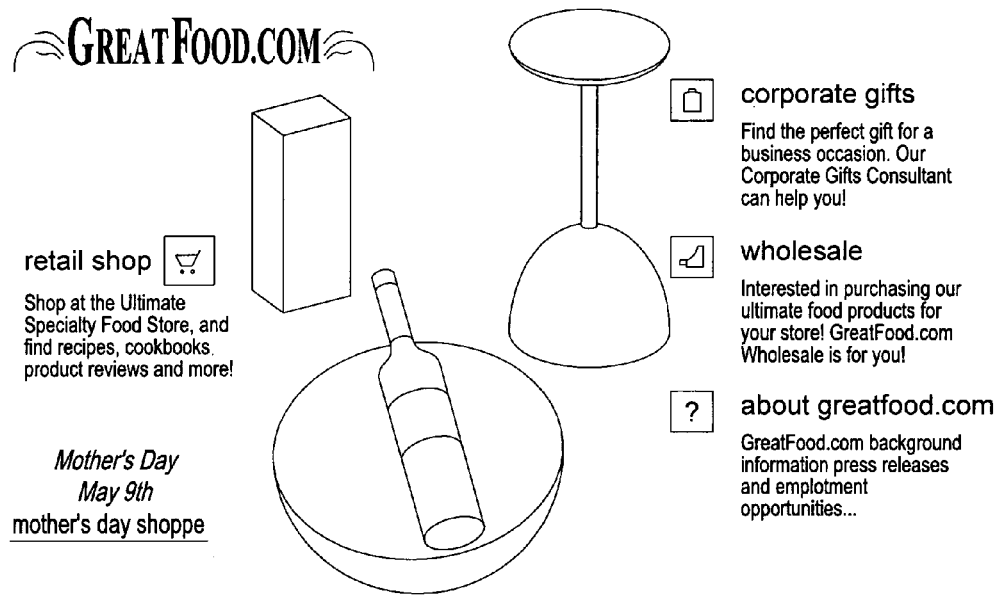
FIG. 8 shows the GreatFoods.Com home page, which has decorative static graphics with no links, as an example of the prior art.

Described is a method and apparatus for the clustered, collaged, integrated, and humanly pleasing presentation of digitally stored objects and their images and related information. Further described are methods of embodying the clusters with their own link-tokens and connecting each cluster to a different set of related information and objects. The clustering also enables simultaneous and collective access of information associated to all objects in the cluster. Additionally described are methods and apparatus for composing the clustered image from individual images, partitioning existing integrated images or photograph of multiple objects, and composing and partitioning clustered images from multiple sources, for the purpose of presenting, associating, and grouping access of categorically related objects and their associated detailed information.

Also described are methods and apparatus to virtually layer the composition of an electronic media page for imparting differentiated perception and context for subjects or objects of different nature, category, or connotation, and provide separate and different connectivity to each virtual layer. The methods of composing and presentation described in the present invention maximize the utilization and dynamic functions of the viewing-area/real-estate of an electronic-mediapage real-estate/viewing-area, optimize presentation efficiency and effectiveness, while minimize, or eliminate the elaborate information access process steps and confusion in the prior art.

Simultaneous presentation of multiple objects as one clustered and integrated body in electronic media that is given a cluster identity and link-token, enables simultaneous access to associated information and related objects linked to all of the clustered objects, collectively, when desired. This cuts short the awkward, repetitive, time consuming, and labor intensive process of going back and forth from the starting page to destination pages for each starting object, one at a time, and at times at many link-depth, to view and examine information/destination-objects linked to each starting object in sequence as practiced in prior art. Individual object identities can also be assigned for individual or selected access when desired. In addition, the described method of clustered and integrated presentation and identity, with retained individual object identity, allows more pleasing, continuous, and associated presentation and perception, and maximized, efficient use of electronic media page, in contrast to the discrete, discontinuous, and abrupt single object representation, presentation, and linking in the prior art. While specific and exact object/product information related to all of the objects in the cluster are assigned to the cluster collectively, the individual elements or objects in the cluster are free to be used for widened options, purposes and connectivity, such as association to other related information or other destinations of interest. Each individual starting object can also be linked to specific information and destination objects related to the particular individual starting object.

In the following descriptions, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid unnecessarily obscuring the present invention.

Figure 9A:
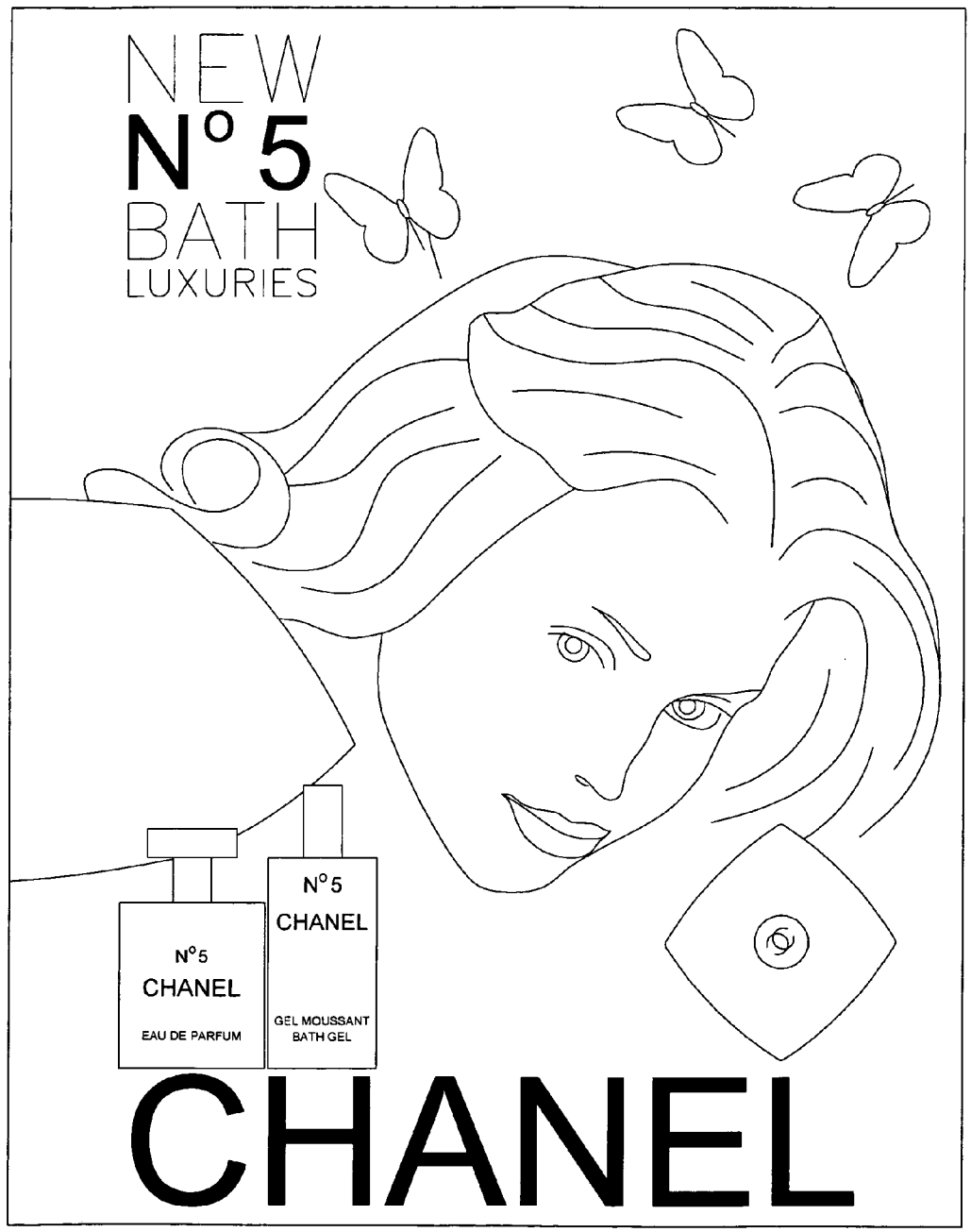
FIGS. 9A–9B show Channel # 5 advertising prints as examples of the prior art.
Figure 9B:
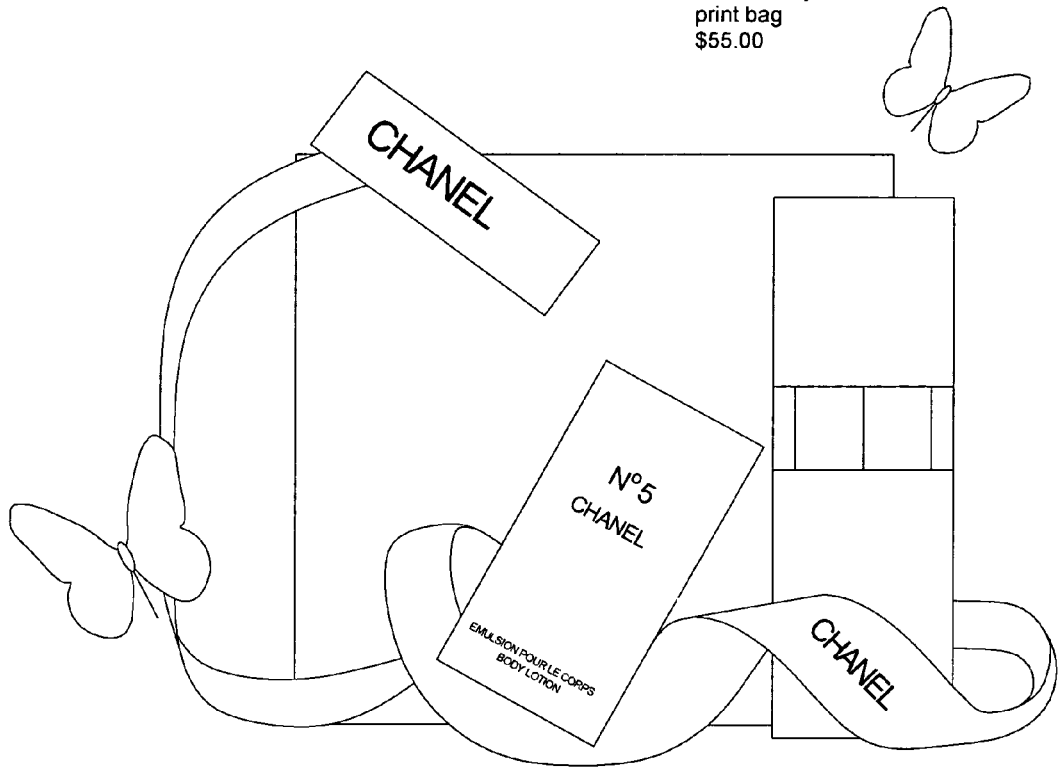
Figure 10A:
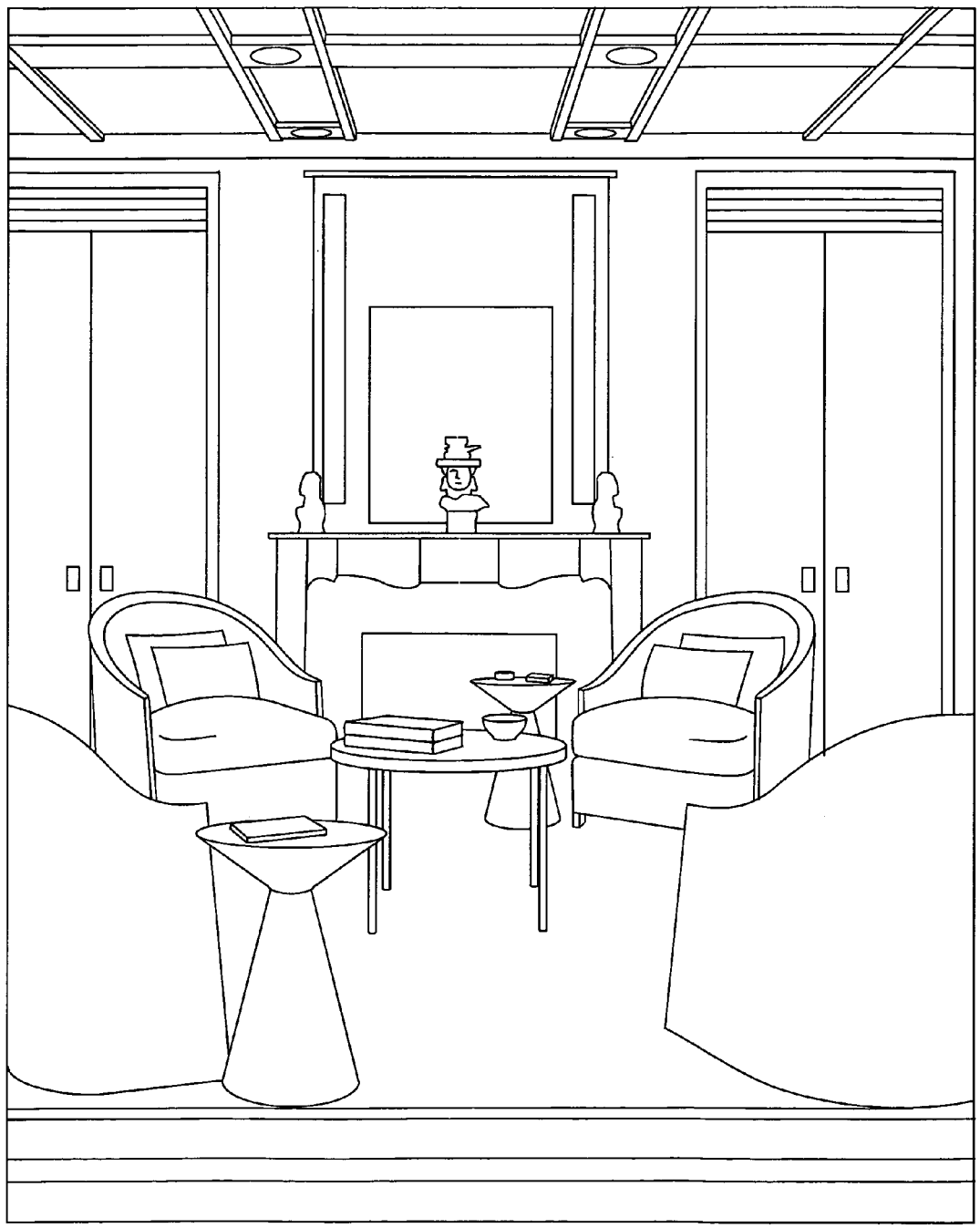
Figure 11A:
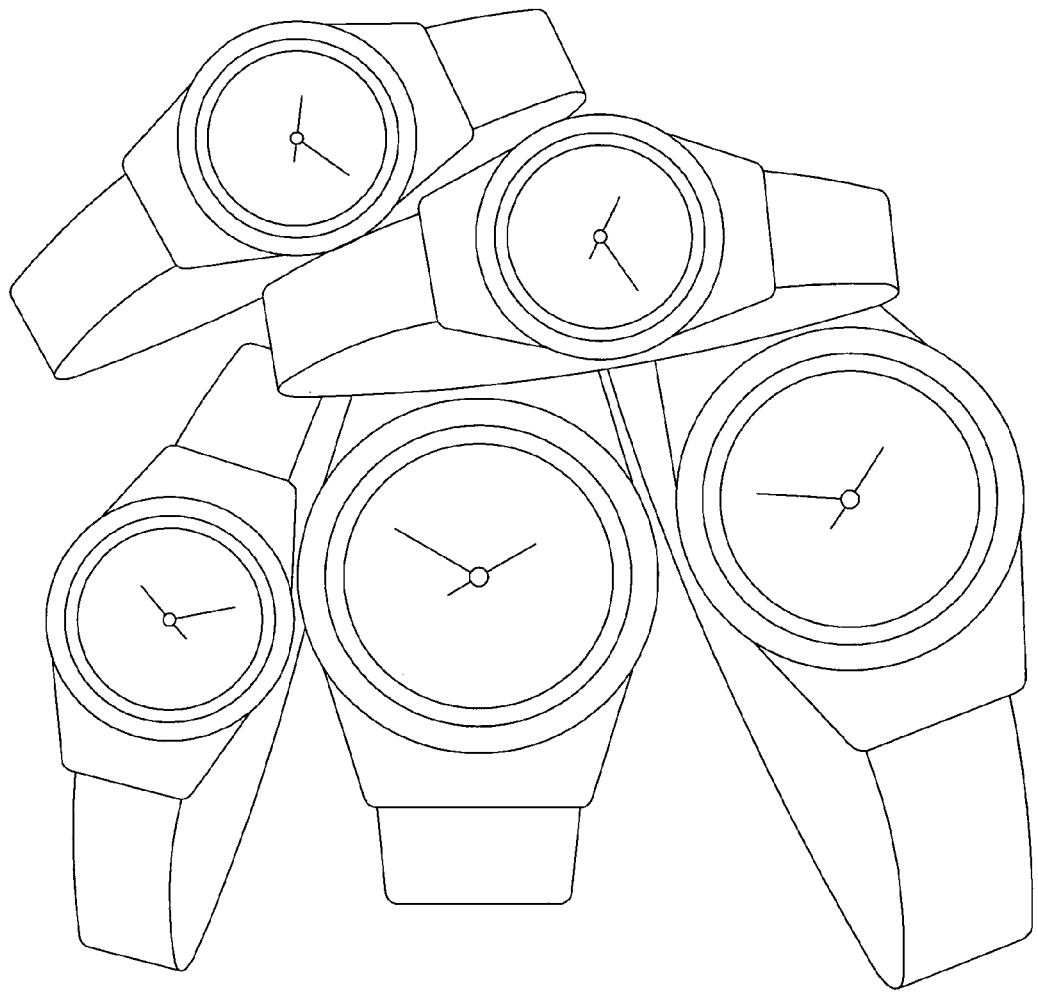
FIG. 11A–11B show Hamilton Jeweler catalog prints as examples of the prior art.
Figure 11B:
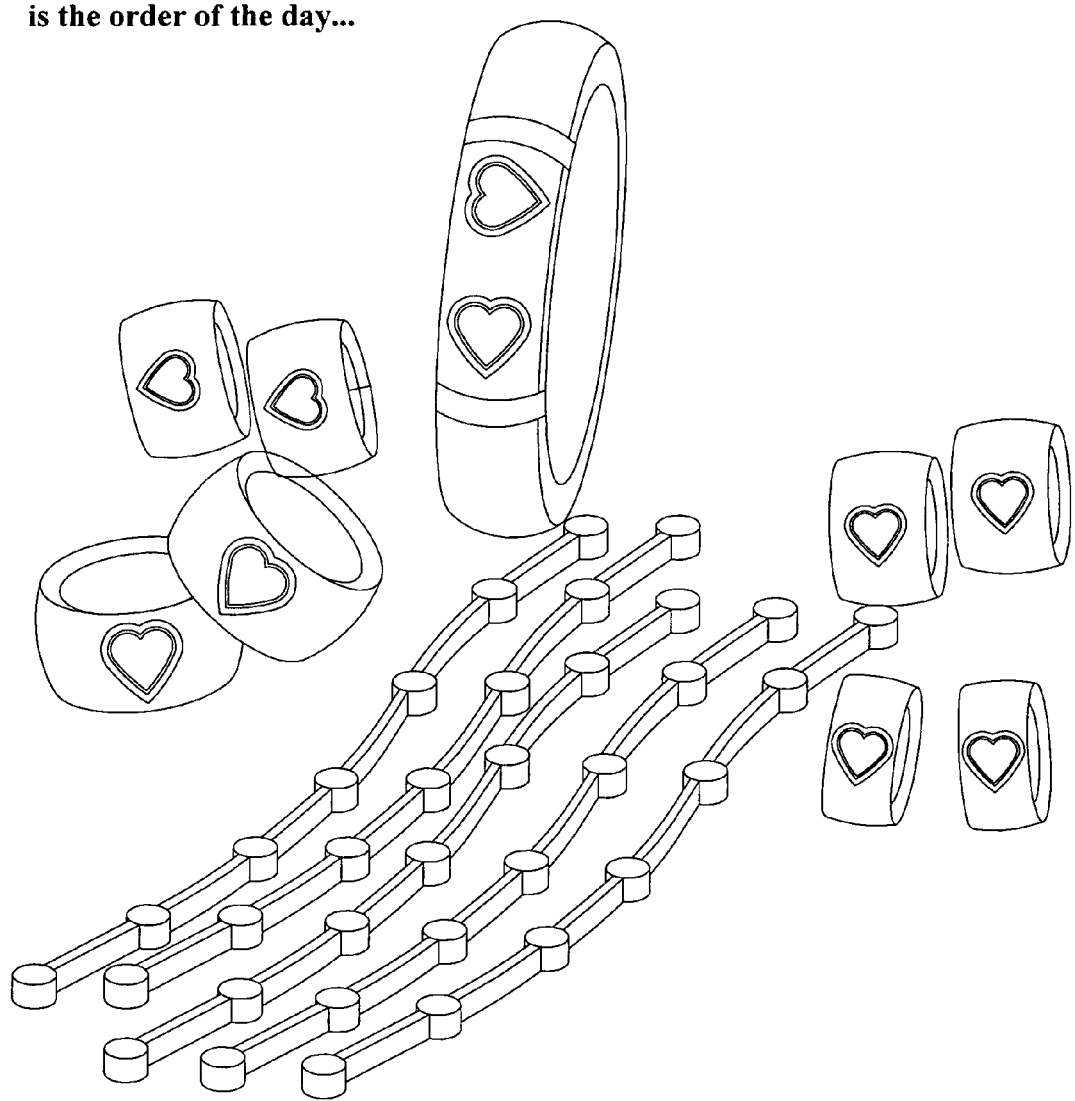

Composition of electronic media pages using the present invention can be accomplished in many ways. The clusters can be composed from individual object images, individual layer images, from object images cut out from multiple existing images containing the desired object images, or partitioning a photograph taken with desired or interested objects arranged together in a desired setting, such as FIGS. 9 through FIGS. 11. Such methods and apparatus allow active utilization of costly developed print and television media images by embedding meaningful and actionable electronic link tokens to elements in the images, and associating the links with meaningful information and actionable venues.

Figure 12:
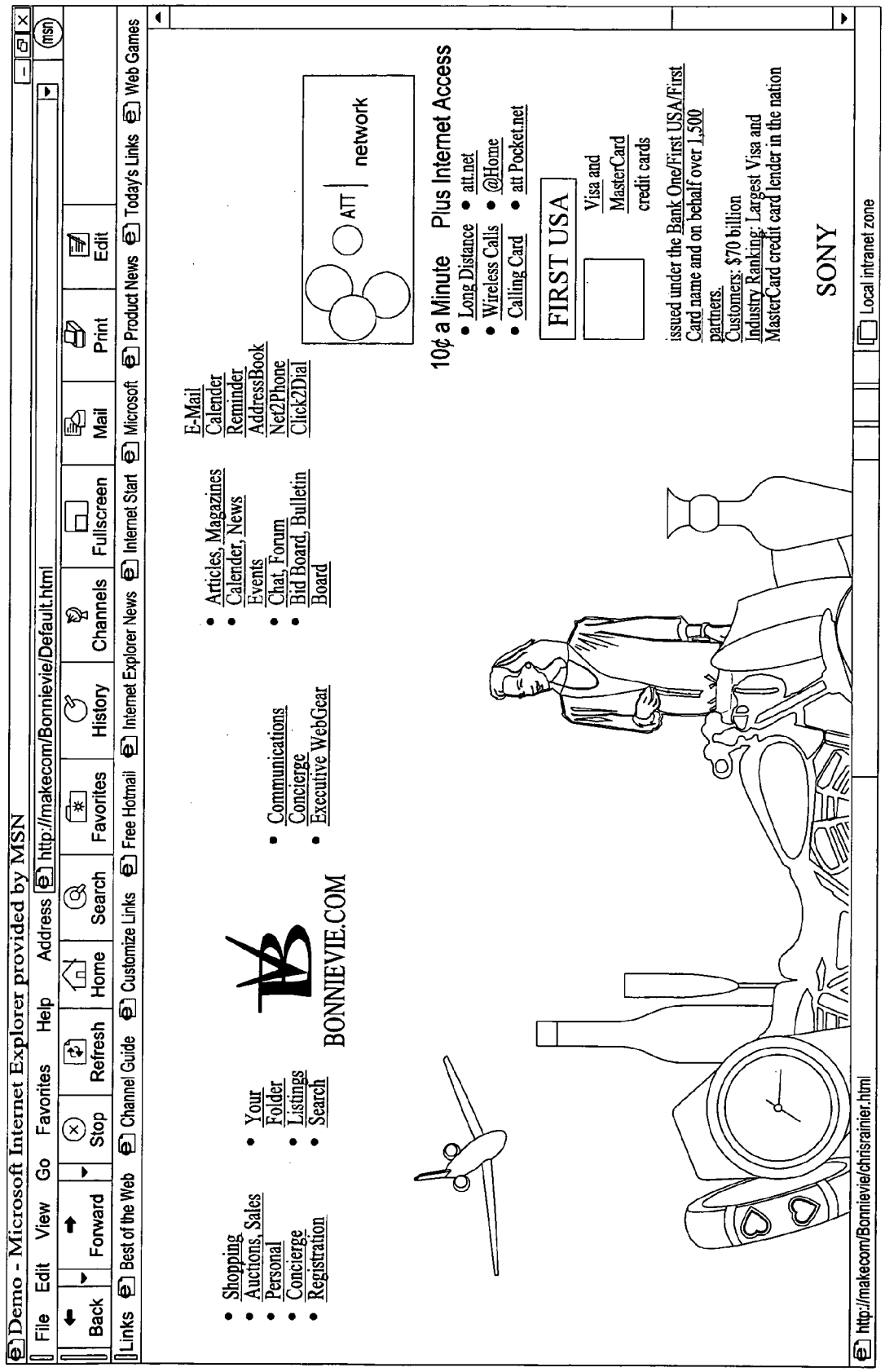
FIG. 12 shows an exemplary embodiment of a collaged, clustered and layered webpage according to the present invention.
Figure 14:
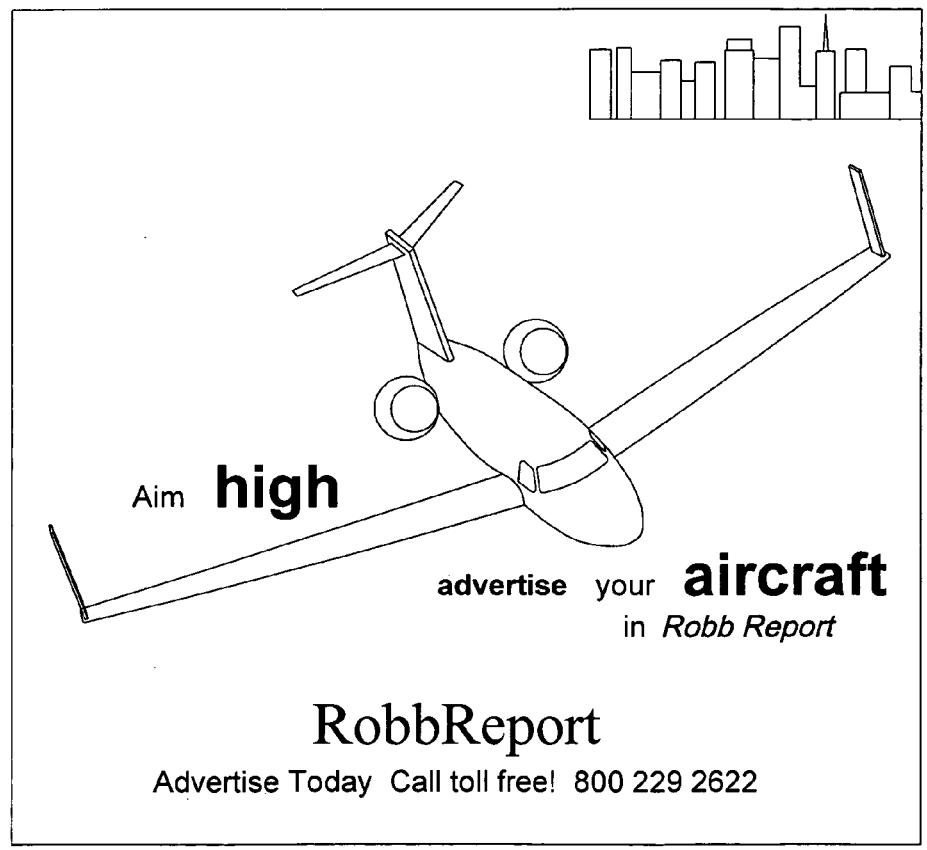
FIG. 14 shows the print media source imported to the jet image in FIG. 12, and converted to electronic media as an destination page linked to the jet image in FIG. 12, illustrating an embodiment of the present invention.

FIG. 12 illustrates an implementation example of the present invention, a hyper-linked electronic media page with 3 virtual layers. The background pyramid layer is a black and white photograph from Chris Rainier, an assistant to Ansel Adams. This virtual layer is linked to the Chris Rainier Gallery page (FIG. 13). It can equally easily be linked to a photography and photograph equipment site, an advertisement for art galleries or photo equipment maker, or information and articles related to photography. The second layer image of a jet, is imported and modified from a print media image (see FIG. 14). As a practical example for this invention, the static image is imported to an electronic database, selected as an element to compose FIG. 12, and a link-token created to link the image of the jet on FIG. 12 to the Robb Report advertising image, which is further partitioned and activated so as to be linked to other active aircraft pages. The jet image in FIG. 12 could equally serve as a link to information, images, or Web-site pages of airlines, jet manufacturers, jet leasing merchant such as Net Jet, articles and information about jet flying or piloting, or a category page regarding airlines, jet manufacturers, jet leasing merchants, etc.

Figure 15A:
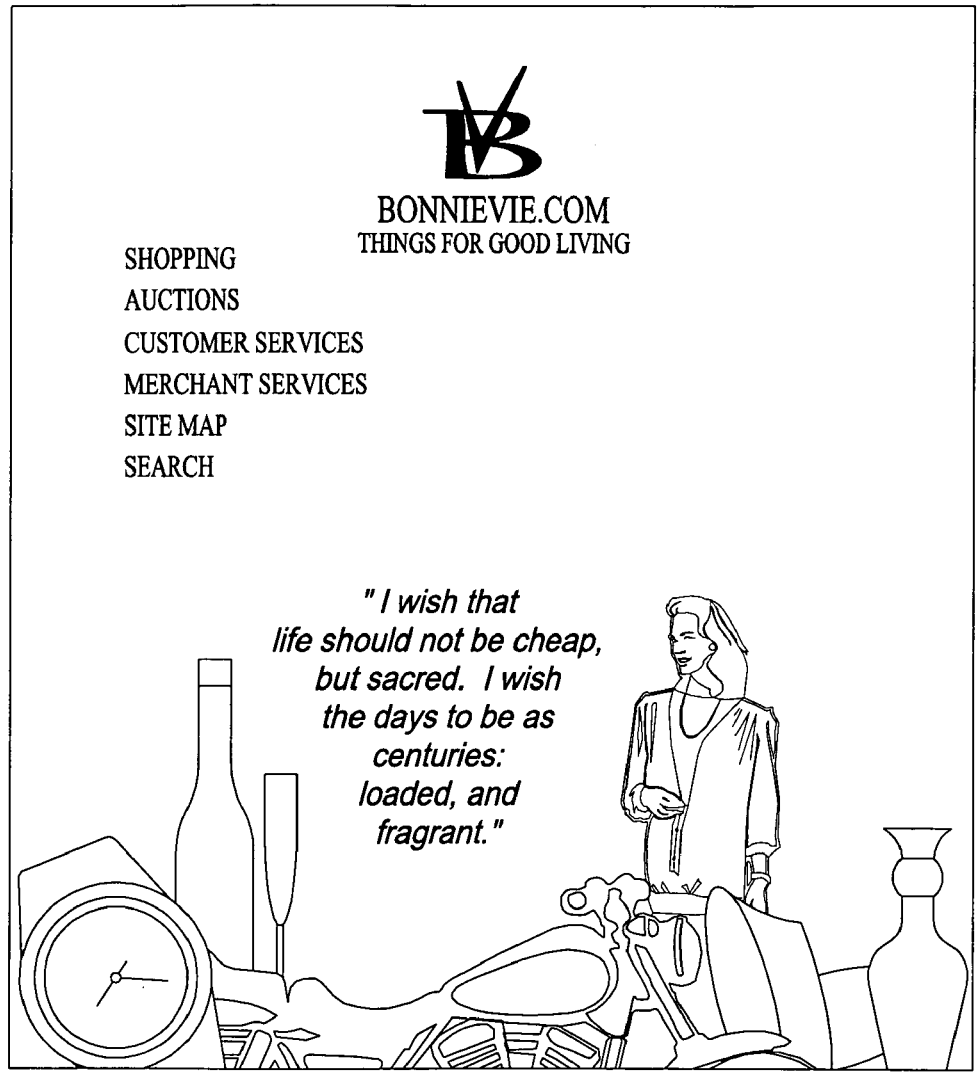
FIGS. 15A–15B show a collaged composition of an electronic media page (15A), partitioned into clustered and individual domains (15B), illustrating an embodiment of the present invention.
Figure 15B:
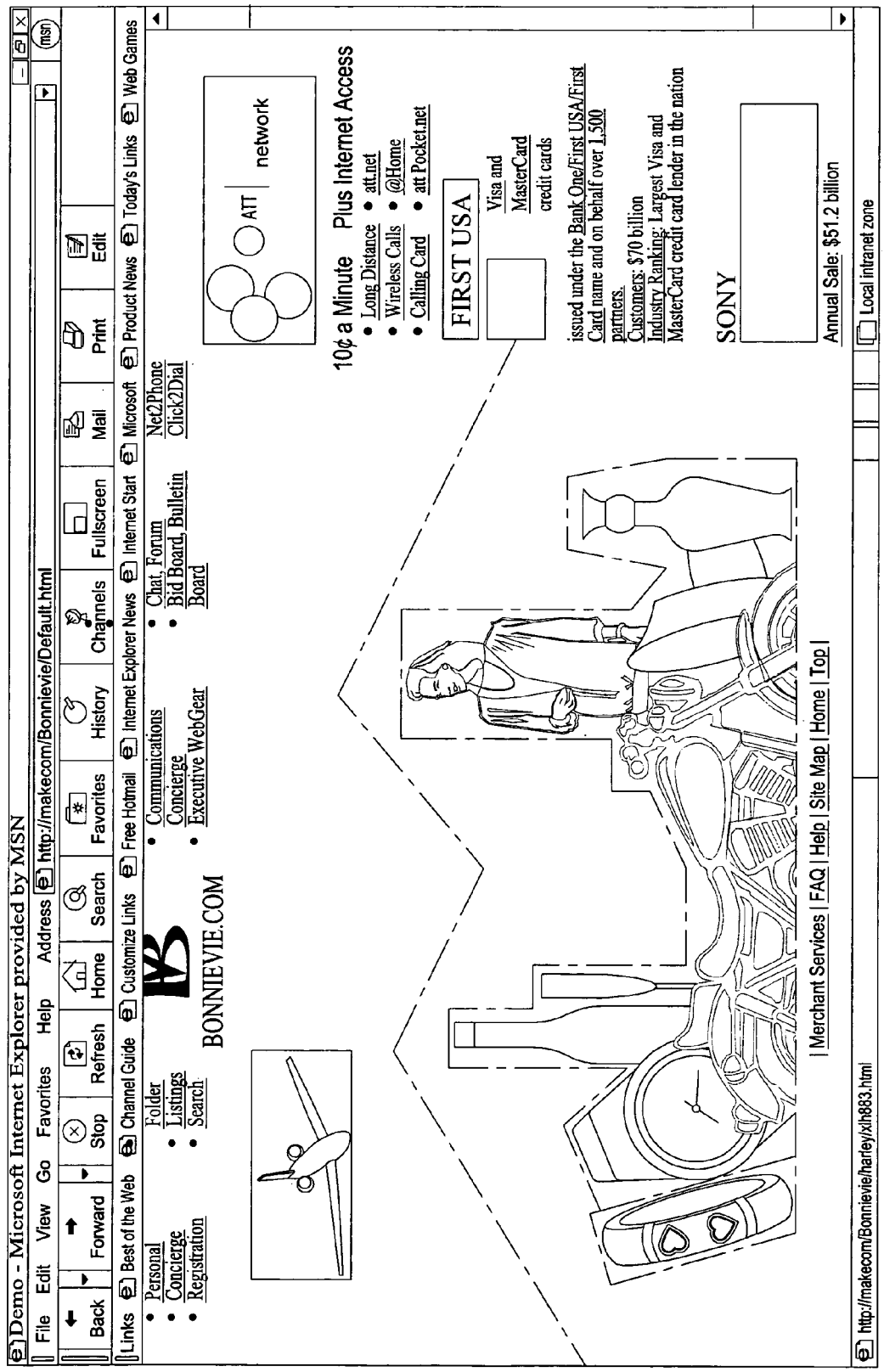
Figure 17:
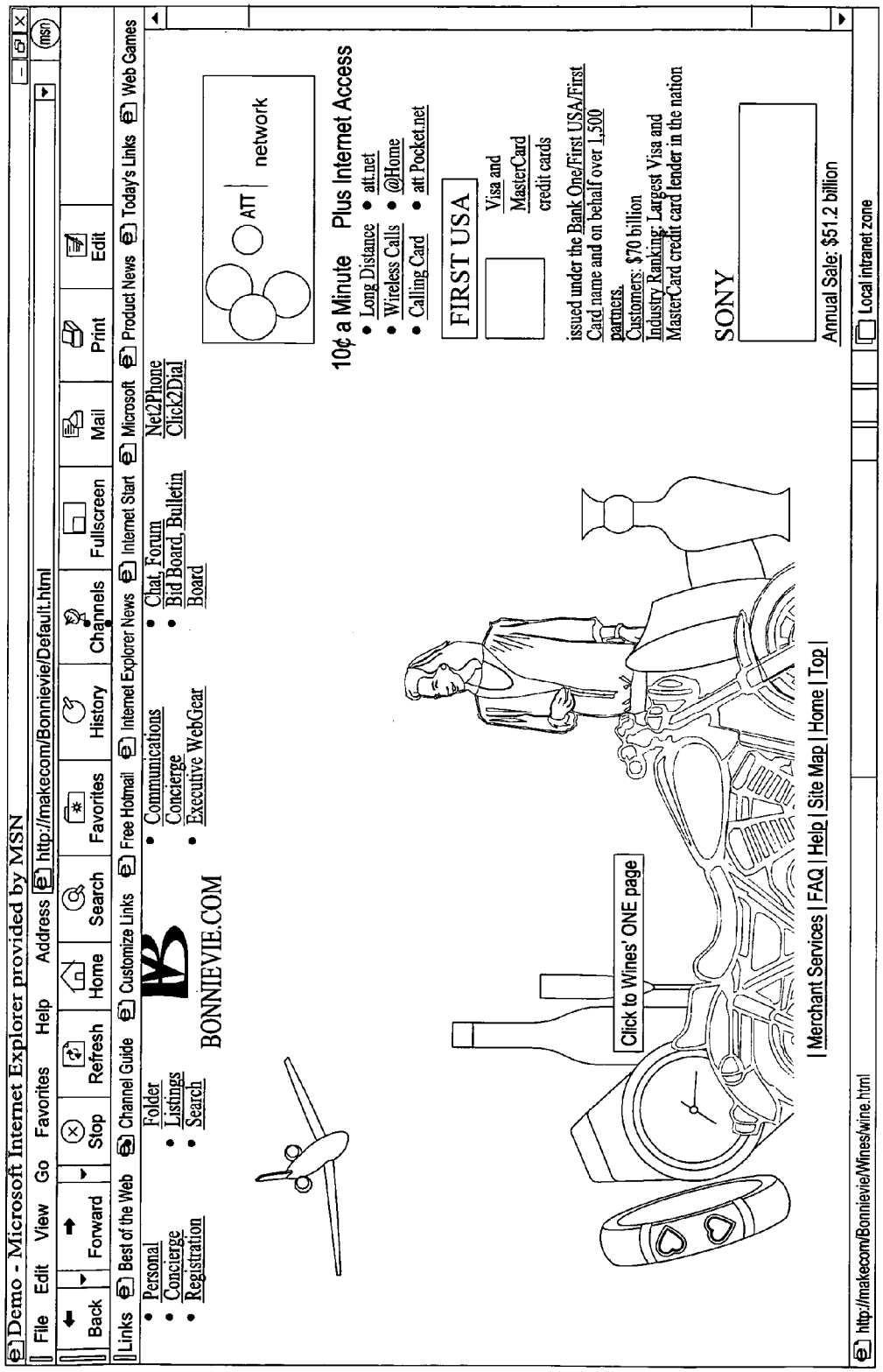
FIG. 17 shows the script-box labeling the link of a partitioned domain, illustrating an embodiment of the present invention. (please drawn a line-boxing around the wine-bottle, the flute, and along the adjacent watch and motorcycle).
Figure 19:
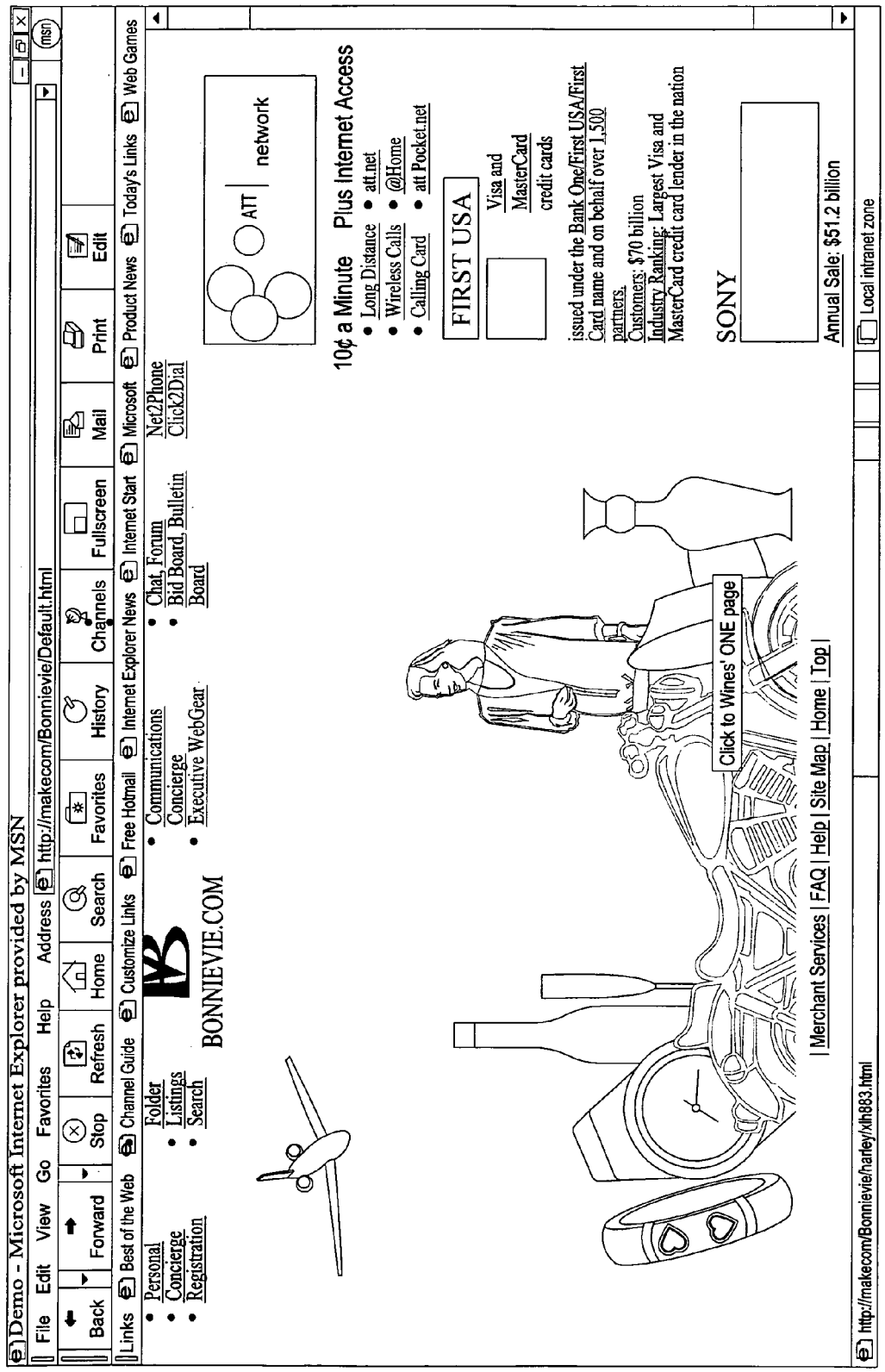
FIG. 19 shows the Harley-Davidson Motorcycle domain, illustrating an embodiment of the present invention.

The third layer demonstrated in FIG. 12 is an integrated cluster of "featured products." The cluster is defined by partitioning a viewing area around the cluster, and subtracting the area further partitioned out for individual objects in the cluster. The cluster domain is associated/assigned a "cluster identity" and a "cluster link." In our example implementation, the cluster identity and link, when invoked, bring forth the images, descriptions, and purchase information of all "featured products" in one web-page (FIGS. 15A, 15B, 15C when printed on paper). Any other information, objects and content can be assigned to associate to this "clustered group," depending on the design intent. All of the seven objects in our design example are partitioned individually with their own domain as shown in FIG. 16. An individual identity and link is assigned to each partition. When the mouse-pointer is moved to any domain, such as a layer or a partition, a script box appears to indicate what the domain is, and what it is linked to. For example, when the pointer is resting at the domain containing the Champagne with the flute, the small text script-box can state "click to wines' ONE page" (or any suitable textual description of the destination page) (FIG. 17). The destination of that link in the example implementation is the Wine Category Home-Page, shown in FIG. 18. One can as well partition the flute separately from the bottle to link it to a wine accessory or a crystal manufacturer's page or its site home page. Alternatively, where the small script-box appears in FIG. 17 when the computer-mouse pointer is resting over a particular domain, one can script in the title and the price of the item to be shown in the script-box. For example, instead of "click to wine's ONE page", the script could shoe key product information, such as "Cognac Champagne, France, 1811, 750 ml, $4500.00". When the link is clicked, the page containing detailed product description is brought forth. The Harley Cycle domain (FIG. 19) is linked to a Harley product description page (FIG. 20), while it can just as well be linked to any other motorcycle manufacturer, parts, or club sites, again, depending on the design intent. The Qing Vase is linked to an Art & Antique page (FIG. 21). In FIG. 19, alternatively, one can script the key product information and the price of the Motorcycle, and when the link is clicked, the detailed product information or the Harley home page can be brought forth, depending on the design intent.

To demonstrate the various ways one can compose such a multi-layer, multi-domain, active electronic media page using elements in the present invention, FIG. 12, an active Web page, is composed from a web page designed by the inventor with a static cluster image (see FIG. 15A) as the "featured products" foreground layer. The Chris Rainier photograph was added to the background. The jet layer is imported from FIG. 14, with the size and image intensity reduced, a technique we call "ghosting." Each layer was given a domain on the page. The "featured product layer" takes the domain around the cluster and the lower portion of the page. The jet layer takes a rectangular area around the jet as its domain. The background layer takes the rest of the screen area as its domain. The vase in the static image (FIG. 15A) is cut out, and replaced with the Qing Vase imported from FIG. 21. An image of a bracelet is imported from FIG. 11 and added to the "featured product" cluster. The individual objects in the cluster are then further partitioned as shown in FIG. 15.

Figure 22A:
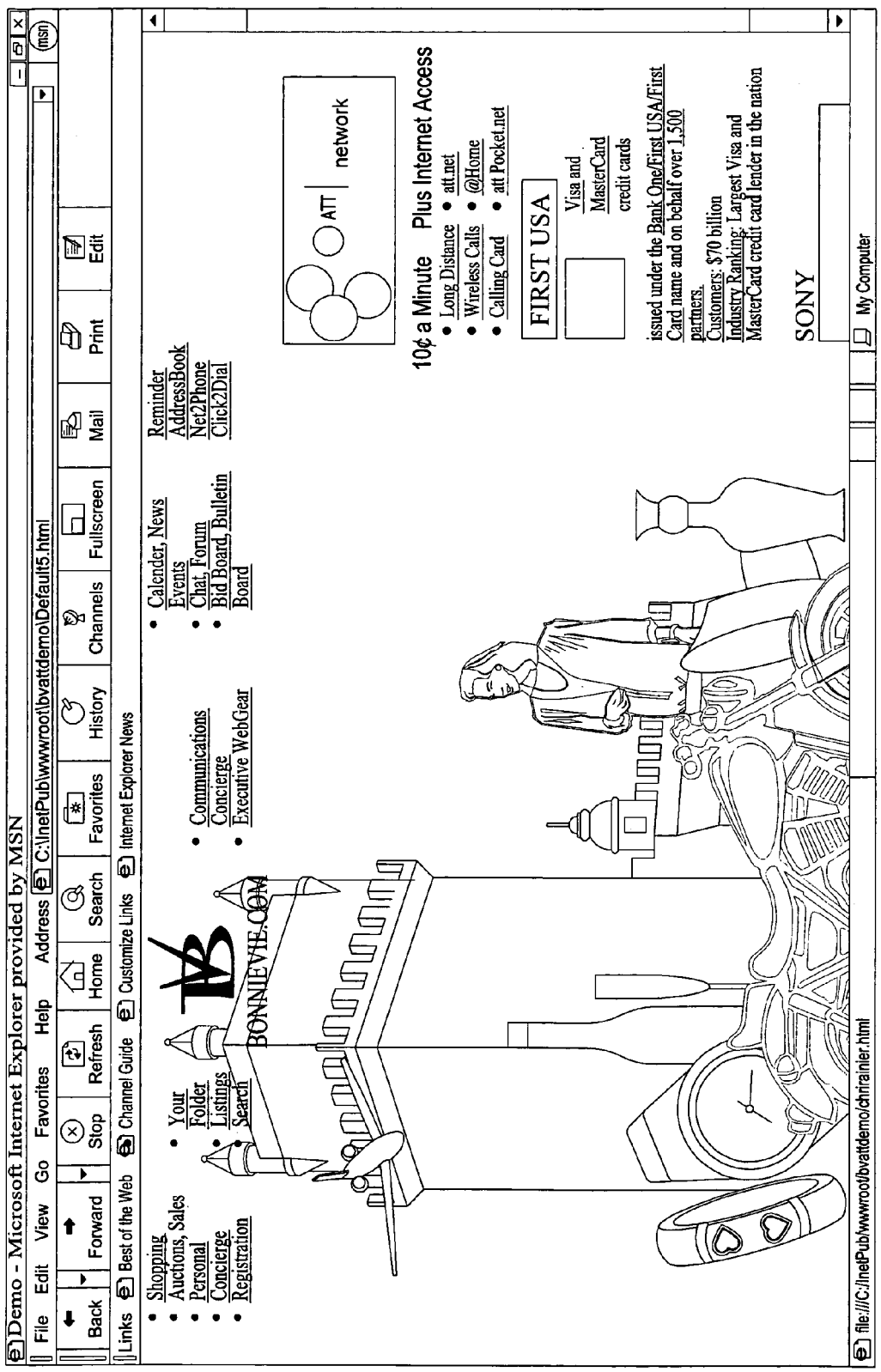
FIGS. 22A–22C show the ghosting process for the background layer, illustrating an embodiment of the present invention.
Figure 22B:
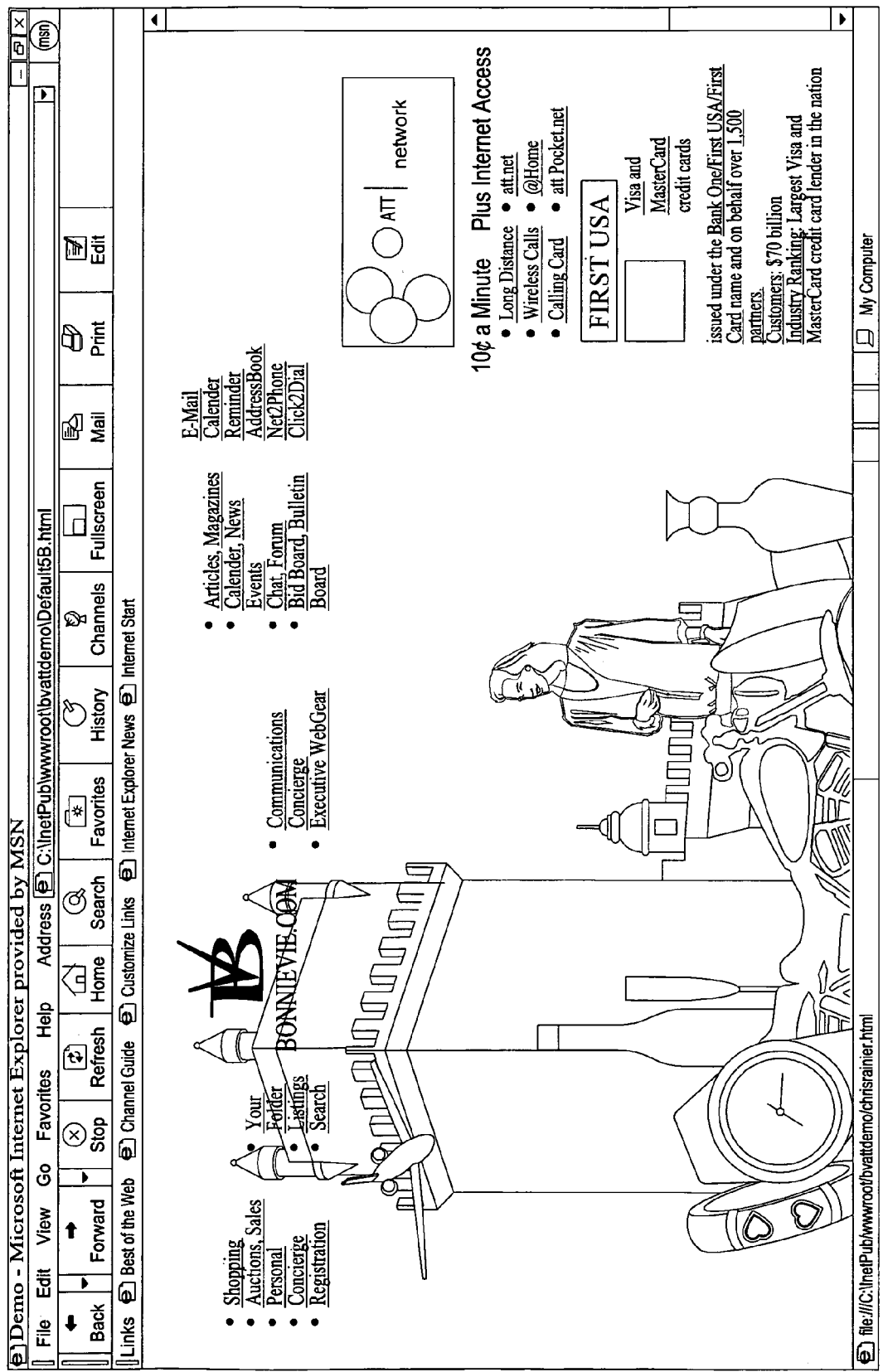
Figure 22C:
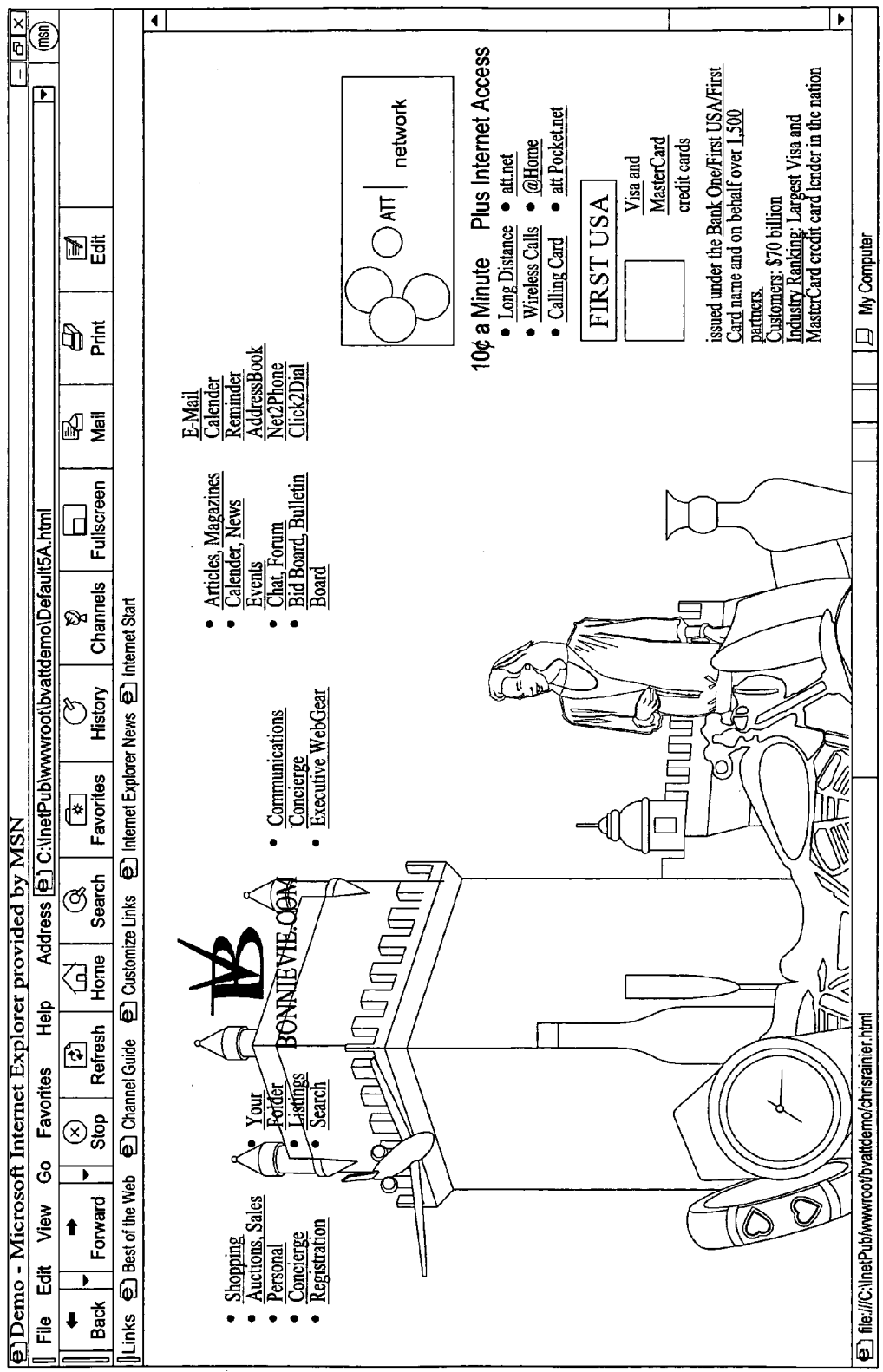

To demonstrate the "ghosting process," we use an unprocessed full-bodied image of the Bel'em Tower at Lisbon Harbor in 22A for its background layer. FIG. 22B illustrates "ghosted" background layer, where the color intensity of the full-bodied image is reduced. The heading layer, the jet layer, and the "featured product" layer all over-lay the "background" layer. In FIG. 22C the color tone of the background layer image is changed for contrast. The "background" image size can also be moved, reduced, or enlarged as desired. Any degree of "ghosting," color-tone change, and image-size reduction, and some degree of enlargement can be implemented at will or artistically for desired effects. We then link the layer to our travel page that contains the original unprocessed image and information about cruising with Seabourn Cruise Lines from Ft. Lauderdale to Lisbon (FIG. 23).

Figure 24A:
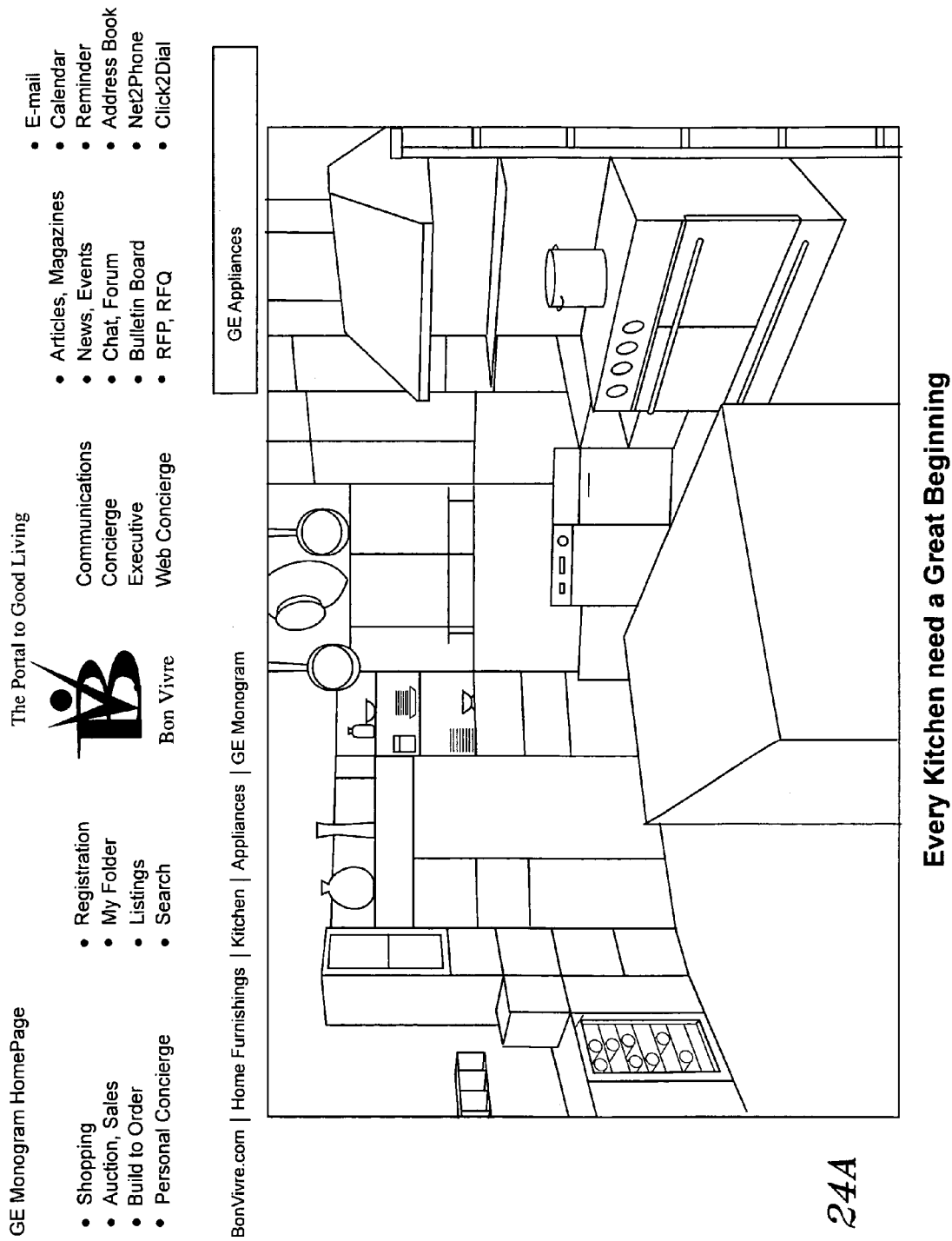

One can also layer and partition existing artistically and expertly staged static photographs or images from traditional print advertising media sources, such as FIGS. 9 through FIGS. 11, and FIG. 24. By converting these images into electronic form, and then partitioning and linking them to further detailed information and active E-commerce functions with methods and apparatus of the present invention, these images can now become functional, dynamic, and actionable, on-line. Thus, the invention adds tremendous value to the static print advertising images. For example, each furniture grouping in FIGS. 10A and 10B can be partitioned as a cluster which is linked to the manufacturer and the designer's profile, the product information and specifications, as well as ordering and purchasing information and functions. The rug can be a layer. The windows, wall, drapes, and the fire place can be other layers. Domains can be created to associate with individual layers, objects, or object groups for assigning dynamic link-tokens. Specific information, objects, or any form of electronic media and E-commerce functions can be assigned to link to each layer, object, or object group for differentiated purposes and results. FIGS. 24 illustrate this particular aspect of the current invention. FIG. 24A is a print media advertising of a GE Monogram Kitchen. The photograph is used in the prior-art GE website as a static decorative photograph without any link. The present invention imports the image, and partitions the range, the refrigerator, the dishwasher, the wine-cooler, etc., to separate domains, each embedded with link-tokens linking to related/relevant information or action pages. For Example, when the range image in FIG. 24A is clicked, a range configuration page is brought forth as shown in FIG. 24B. When the refrigerator image in FIG. 24A is clicked, the information page of the refrigerator is brought forth as shown in FIG. 24C. When the dishwasher image in FIG. 24A is clicked, the information page for the dishwasher is brought forth as shown in FIG. 24D. When the wine cooler image is clicked, the information page for the wine-cooler is brought forth as shown in FIG. 24E.

The present invention is implemented using software, which can be written in many computer languages. The present invention can be used on a global or local computer network, on a personal computer, on viewable storage media such as a CD ROM, on a wireless telephone, on a wireless personal assistant such as a Palm Pilot®, or on any type of wired or wireless device that enables digitally stored information to be viewed. Also, information displayed and viewed using the present invention can be printed, stored to other storage medium, and electronically mailed to third parties.

Numerous modifications to and alternative embodiments of the present invention will be apparent to those skilled to the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications that come within the scope of the appended claims is reserved.

What is claimed is:

1. A system for displaying at least one clustered presentation of a plurality of digitally stored objects, comprising:
   a computer configured to display at least one clustered graphical presentation of a plurality of images of a first plurality of digitally stored objects on a viewing device, wherein the at least one clustered presentation has a link-token to at least one associated destination object for simultaneously and collectively accessing and displaying the at least one associated destination object, the computer being configured to display a script box describing the at least one associated destination object when a pointing device is moved to the display of the clustered graphical presentation on the viewing device.

2. The system according to claim 1, wherein each image of a different digitally stored object in the at least one clustered presentation has a script box and a link-token to at least one destination object associated with said different digitally stored object, the computer being further configured so that when the pointing device is moved to an image of one of the digitally stored objects the computer causes the script box associated with the image of the one of the digitally stored objects to be displayed.

3. The system according to claim 1, wherein the at least one clustered presentation is composed by partitioning a single image.

4. The system according to claim 1, wherein the at least one clustered presentation is composed by partitioning the plurality of images.

5. The system according to claim 1, wherein a group identity is assigned to the at least one clustered presentation.

6. The system according to claim 1, wherein a memory address is assigned to the at least one clustered presentation.

7. The system according to claim 1, wherein a domain is assigned to the at least one clustered presentation.

8. The system according to claim 1, wherein the size, color, tone and shading of the at least one clustered presentation is selectively changeable.

9. The system according to claim 1, wherein the computer is further configured for simultaneously displaying a plurality of layers of graphical presentations of a second plurality of digitally stored objects on the viewing device.

10. The system according to claim 9, wherein each one of the plurality of layers has a link-token for accessing and displaying at least one associated destination object.

11. The system according to claim 9, wherein each one of the second plurality of digitally stored objects has a link-token for accessing and displaying at least one associated destination object.

12. The system according to claim 9, wherein each one of the plurality of layers is composed from a plurality of images.

13. The system according to claim 9, wherein an identity is assigned to each one of the plurality of layers.

14. The system according to claim 9, wherein a memory address is assigned to each one of the plurality of layers.

15. The system according to claim 9, wherein a domain is assigned to each one of the plurality of layers.

16. The system according to claim 9, wherein the plurality of layers include a foreground layer and a background layer.

17. The system according to claim 9, wherein the size, color, tone and shading of each layer is selectively changeable.

18. The system according to claim 9, wherein the at least one clustered graphical presentation of the first plurality of digitally stored objects and at least one of the plurality of layers of graphical presentations of the second plurality of digitally stored objects are simultaneously displayed for viewing on the viewing device.

19. The system according to claim 9, wherein at least one linked destination object associated with the at least one clustered graphical presentation of the first plurality of digitally stored objects and at least one of the linked destination objects associated with the plurality of layers of graphical presentations of the second plurality of digitally stored objects are simultaneously displayed for viewing on the display device.

20. The system according to claim 9, wherein at least one linked destination object associated with the at least one clustered graphical presentation of the first plurality of digitally stored objects and at least one linked destination object associated with at least one of the second plurality of digitally stored objects are simultaneously displayed for viewing on the viewing device.

21. The system according to claim 9, wherein at least one linked destination object associated with at least one of the first plurality of digitally stored objects and at least one of the linked destination objects associated with the plurality of layers of graphical presentations of the second plurality of digitally stored objects are simultaneously displayed for viewing on the viewing device.

22. The system according to claim 9, wherein at least one linked destination object associated with at least one of the first plurality of digitally stored objects and at least one linked destination object associated with at least one of the second plurality of digitally stored objects are simultaneously displayed for viewing on the viewing device.

23. A method for displaying information on a viewing device of a computer system, the method comprising:
   composing a first clustered graphical presentation comprising a plurality of domains;
   associating each domain of the plurality of domains with a script box and a link;
   when the link of said each domain is invoked, linking to a destination associated with the link; and
   when the first clustered graphical presentation is displayed and a pointing device is moved to said each domain, displaying a script box with information regarding the destination associated with the link of said each domain.

24. The method according to claim 23, wherein the domains of the plurality of domains have been created by partitioning an image, so that the domains of the plurality of domains are contiguous in the clustered graphical presentation.

25. The method according to claim 23, further comprising:
  including the first clustered graphical presentation in a first display layer;
  composing a second graphical presentation comprising at least one domain;
  associating the at least one domain of the second graphical presentation with a script box and a link;
  including the second graphical presentation in a second layer;
  displaying the first layer and the second layer, wherein the first clustered graphical presentation and the second graphical presentation are displayed;
  when the link of the at least one domain of the second graphical presentation is invoked, linking to a destination associated with the at least one domain of the second graphical presentation; and
  when a pointing device is moved to the at least one domain of the second graphical presentation, displaying a script box with information regarding the destination associated with the at least one domain of the second graphical presentation.

26. A method according to claim 23, further comprising step for ghosting at least one of the first and second layers.

27. A method according to claim 23, wherein said each domain comprises an image of an article, the information regarding the destination associated with the link of said each domain comprises description of the article, and the article can be purchased at the destination associated with the link of said each domain.

28. A method for displaying information on a viewing device of a computer system, the method comprising:
  displaying to a user a plurality of graphical presentations, each graphical presentation comprising a plurality of images, wherein each image of each plurality of images of each graphical presentation is associated with a different textual representation and a different link;
  when the user invokes a link of an image of the plurality of images of a graphical presentation of the plurality of graphical presentations, linking the user to a destination associated with the invoked link; and
  when the user moves a pointing device of the computer system to rest on an image of the plurality of images of a graphical presentation of the plurality of graphical presentations, displaying a textual representation associated with the image on which the pointing device is resting.

29. A method according to claim 28, wherein each graphical presentation of the plurality of graphical presentations corresponds to a separate layer.

30. A method according to claim 28, wherein each graphical presentation of the plurality of graphical presentations comprises a clustered graphical presentation.

31. A method of accessing information, the method comprising:
  causing display of information in accordance with claim 28; and
  moving a pointing device on the viewing device to rest on the images, thereby causing display of the textual boxes associated with the images.

* * * * *